US012639211B2

(12) United States Patent
Shin et al.

(10) Patent No.: US 12,639,211 B2
(45) Date of Patent: May 26, 2026

(54) SOFT DECISION DECODING USING PRELIMINARY DATA IN STORAGE DEVICE

(71) Applicant: SAMSUNG ELECTRONICS CO., LTD., Suwon-si (KR)

(72) Inventors: Junho Shin, Suwon-si (KR);
Soonyoung Kang, Suwon-si (KR);
Hanbyeul Na, Suwon-si (KR);
Dong-Min Shin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/809,972

(22) Filed: Aug. 20, 2024

(65) Prior Publication Data

US 2025/0245146 A1 Jul. 31, 2025

(30) Foreign Application Priority Data

Jan. 29, 2024 (KR) ........................ 10-2024-0013267

(51) Int. Cl.
*G06F 12/02* (2006.01)
(52) U.S. Cl.
CPC ................................ *G06F 12/0246* (2013.01)
(58) Field of Classification Search
CPC ............. G06F 11/1068; G06F 11/1012; G06F 3/0679; G06F 11/1048; G06F 3/061; G06F 3/0619; G06F 3/0659; G06F 11/1008; G06F 11/1052; G06F 11/0772; G06F 12/0246; G06F 11/1044; G06F 11/3037; G06F 13/1668; G06F 3/0608; G06F 3/0611; G06F 3/0616; G06F 3/0658
See application file for complete search history.

(56) References Cited

U.S. PATENT DOCUMENTS

| | | | |
|---|---|---|---|
| 8,576,622 B2 | 11/2013 | Yoon et al. | |
| 9,224,489 B2 * | 12/2015 | Chae ................. | G11C 16/0483 |
| 9,312,016 B2 * | 4/2016 | Kim ...................... | G11C 16/26 |
| 9,954,558 B1 | 4/2018 | Steiner et al. | |
| 11,456,758 B1 | 9/2022 | Zamir et al. | |
| 11,556,416 B2 | 1/2023 | Tishbi et al. | |
| 11,675,530 B2 | 6/2023 | Lee et al. | |
| 2011/0197015 A1 * | 8/2011 | Chae ..................... | G11C 16/26 |
| | | | 711/E12.008 |

(Continued)

FOREIGN PATENT DOCUMENTS

| | | |
|---|---|---|
| JP | 2023-78545 A | 6/2023 |
| KR | 10-2012-0058694 A | 6/2012 |

(Continued)

*Primary Examiner* — Tasnima Matin
(74) *Attorney, Agent, or Firm* — Sughrue Mion, PLLC

(57) ABSTRACT

An operation method of a controller for controlling a memory device, including: sequentially receiving first hard decision data and first data from a first memory block of the memory device; based on the receiving of the first hard decision data being completed, starting initial soft decision decoding based on the first hard decision data and first coarse data; while the initial soft decision decoding is being performed, replacing the first coarse data with first soft decision data based on the first data received from the memory device; and after the initial soft decision decoding is completed, performing first soft decision decoding based on the first hard decision data and the first soft decision data.

20 Claims, 27 Drawing Sheets

(56) References Cited

U.S. PATENT DOCUMENTS

| | | | |
|---|---|---|---|
| 2017/0300377 A1 | 10/2017 | Kaynak et al. | |
| 2023/0034098 A1 | 2/2023 | Tishbi | |
| 2023/0170004 A1 | 6/2023 | Azuma et al. | |
| 2023/0402071 A1* | 12/2023 | Park | G11C 11/5671 |
| 2024/0395352 A1* | 11/2024 | Lee | G06F 11/1048 |
| 2025/0004877 A1* | 1/2025 | Tan | G06F 11/1056 |
| 2025/0021431 A1* | 1/2025 | Shin | G06F 11/1044 |
| 2025/0053302 A1* | 2/2025 | Park | G11C 16/32 |

FOREIGN PATENT DOCUMENTS

| | | |
|---|---|---|
| KR | 10-1889864 B1 | 8/2018 |
| KR | 10-2022-0034341 A | 3/2022 |

* cited by examiner

SOFT DECISION DECODING USING PRELIMINARY DATA IN STORAGE DEVICE

CROSS-REFERENCE TO RELATED APPLICATIONS

This application is based on and claims priority under 35 U.S.C. § 119 to Korean Patent Application No. 10-2024-0013267 filed on Jan. 29, 2024, in the Korean Intellectual Property Office, the disclosure of which is incorporated by reference herein in its entirety.

BACKGROUND

1. Field

The present disclosure relates to a semiconductor memory, and more particularly, to a controller configured to control a memory device, an operation method of the controller, and an operation method of a storage device including the memory device and the controller.

2. Description of Related Art

A semiconductor memory may be classified as a volatile memory, which may lose data stored therein when a power is turned off, such as a static random access memory (SRAM) or a dynamic random access memory (DRAM), or as a nonvolatile memory, which may retain data stored therein even when a power is turned off, such as a flash memory, a phase-change RAM (PRAM), a magnetic RAM (MRAM), a resistive RAM (RRAM), or a ferroelectric RAM (FRAM).

A flash memory device may be used as a high-capacity storage medium. Due to a physical characteristics of the flash memory device or various ambient factors, an error may occur in data stored in the flash memory device. This error may be corrected using a separate error correction process. For example, an error correction code (ECC) engine may correct the data error using iterative decoding for data read from the flash memory device. However, the iterative decoding may cause a delay. Due to the delay, performance may be reduced.

SUMMARY

Provided are a controller configured to control a memory device with improved performance and improved reliability, an operation method of the controller, and an operation method of a storage device including the memory device and the controller.

Additional aspects will be set forth in part in the description which follows and, in part, will be apparent from the description, or may be learned by practice of the presented embodiments.

In accordance with an aspect of the disclosure, an operation method of a controller for controlling a memory device includes: sequentially receiving first hard decision data and first data from a first memory block of the memory device; based on the receiving of the first hard decision data being completed, starting initial soft decision decoding based on the first hard decision data and first coarse data; while the initial soft decision decoding is being performed, replacing the first coarse data with first soft decision data based on the first data received from the memory device; and after the initial soft decision decoding is completed, performing first soft decision decoding based on the first hard decision data and the first soft decision data.

In accordance with an aspect of the disclosure, a controller for controlling a memory device includes: a NAND interface circuit configured to receive first hard decision data and first compressed soft decision data from the memory device; a decompression engine configured to decompress the first compressed soft decision data to generate first soft decision data; a random access memory (RAM) configured to store the first hard decision data and the first soft decision data; and an error correction code (ECC) engine configured to: based on the first hard decision data being stored in the RAM, start initial soft decision decoding based on the first hard decision data and first coarse data, and after the first soft decision data is stored in the RAM, perform first soft decision decoding based on the first hard decision data and the first soft decision data.

In accordance with an aspect of the disclosure, an operation method of a storage device including a memory device and a controller includes: transmitting, by the controller, a read command to the memory device; generating, by the memory device, first hard decision data and first soft decision data by performing a read operation on a selected word line based on the read command; generating, by the memory device, first compressed soft decision data by compressing the first soft decision data; transmitting, by the memory device, the first hard decision data and the first compressed soft decision data to the controller; based on reception of the first hard decision data being completed by the controller, starting, by the controller, initial soft decision decoding based on the first hard decision data and first coarse data; generating, by the controller, first decompressed soft decision data by decompressing the first compressed soft decision data; and performing first soft decision decoding based on the first hard decision data and the first decompressed soft decision data.

In accordance with an aspect of the disclosure, an operation method of a storage device including a memory device and a controller includes: sequentially reading hard decision data and soft decision data from the memory device; before the reading of the soft decision data is completed, starting initial soft decision decoding based on the hard decision data and coarse data; and after the reading of the soft decision data is completed, starting first soft decision decoding based on the hard decision data and the soft decision data.

BRIEF DESCRIPTION OF DRAWINGS

The above and other aspects, features, and advantages of certain embodiments of the present disclosure will be more apparent from the following description taken in conjunction with the accompanying drawings, in which:

FIG. 2 is a block diagram illustrating a controller of FIG. 1, according to an embodiment of the present disclosure;

FIG. 3 is a block diagram illustrating a memory device of FIG. 1, according to an embodiment of the present disclosure;

DETAILED DESCRIPTION

Below, embodiments of the present disclosure are described in detail and clearly to such an extent that a person having ordinary skill in the art may more easily carry out the present disclosure.

In the detailed description or drawings, function blocks which are expressed using the terms "unit", "module", etc. may be implemented in the form of hardware, software, or a combination thereof, which may be configured to perform a specific function. As an example, a "computing module" may refer to a hardware circuit configured to perform a relevant function or operation disclosed in the detailed description.

Figure 1:
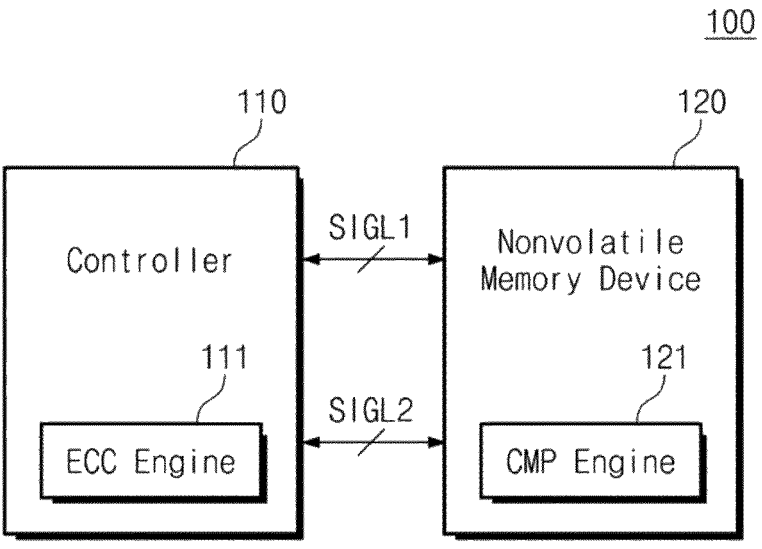
FIG. 1 is a block diagram illustrating a storage device according to an embodiment of the present disclosure.

FIG. 1 is a block diagram illustrating a storage device according to an embodiment of the present disclosure.

Referring to FIG. 1, a storage device 100 may include a controller 110 and a memory device 120, which may be for example a nonvolatile memory device. In an embodiment, the storage device 100 may be a high-capacity storage device, which may be configured to store data in a computing system, such as a solid state drive (SSD) or a universal flash storage (UFS) card, but embodiments are not limited thereto. In some embodiments, the storage device 100 may be included in a mobile system such as a mobile phone, a smart phone, a tablet personal computer (PC), a wearable device, a health care device, or an internet of things (IOT) device. In some embodiments, the storage device 100 may be included in a personal computer, a laptop computer, a server, a media player, or an automotive device such as a navigation system.

The controller 110 may be configured to control the memory device 120. For example, the controller 110 may store data in the memory device 120 or may read data stored in the memory device 120. For example, the controller 110 may transmit a command CMD and an address ADDR to the memory device 120 through first signal lines SIGL1 and may exchange data DATA with the memory device 120 through the first signal lines SIGL1. In an embodiment, the first signal lines SIGL1 may be data signal lines (e.g., DQ lines). The controller 110 may transmit control signals CTRL to the memory device 120 through second signal lines SIGL2. In an embodiment, the control signals CTRL may be used to classify signals exchanged through the first signal lines SIGL1 into the command CMD, the address ADDR, and the data DATA. However, embodiments are not limited thereto.

The memory device 120 may operate under control of the controller 110. For example, in response to or based on signals received from the controller 110, the memory device 120 may store data or may output the stored data. In an embodiment, the memory device 120 may include a flash memory device, but embodiments are not limited thereto.

The controller 110 may include an error correction code (ECC) engine 111. The ECC engine 111 of the controller 110 may be configured to detect or correct an error in the data stored in the memory device 120. For example, due to the physical characteristic of the memory device 120 or various external factors, an error may occur in data stored in the memory device 120. The ECC engine 111 may generate ECC data by performing ECC encoding for user data to be stored in the memory device 120. The ECC data may be stored in the memory device 120 together with the user data. The ECC engine 111 may detect and correct an error included in read data by performing an ECC decoding operation based on the data and relevant ECC data read from the memory device 120.

In an embodiment, the ECC engine 111 may detect and correct an error in the data based on a soft decision decoding scheme. For example, under control of the controller 110, the memory device 120 may perform the read operation on memory cells to generate hard decision data and soft decision data. Examples of the hard decision data and the soft decision data are described in detail with reference to FIGS. 5A to 5C. The controller 110 may receive the hard decision data and the soft decision data from the memory device 120 and may correct an error in the data by performing iterative soft decision decoding based on the received hard decision data and the received soft decision data.

In an embodiment, soft decision decoding may be performed using both the hard decision data and the soft decision data. For example, the controller 110 may receive both the hard decision data and the soft decision data and may then start soft decision decoding. In this case, a time point when soft decision decoding starts may be delayed.

According to an embodiment of the present disclosure, the memory device 120 may include a compression engine 121. In some embodiments, the compression engine 121 may be, or may include, a compression circuit. The compression engine 121 may compress soft decision data to be transmitted to the controller 110 and may transmit the compressed soft decision data to the controller 110. In an embodiment, the compression engine 121 may perform a compression operation based on loss compression, but embodiments are not limited thereto. In this case, because compressed soft decision data of a relatively small size may be provided to the controller 110, a time taken to transmit the soft decision data may be shortened. Accordingly, a time point when the ECC engine 111 of the controller 110 may start soft decision decoding may be advanced.

According to an embodiment of the present disclosure, before soft decision data or compressed soft decision data may be received from the memory device 120, the ECC engine 111 of the controller 110 may start soft decision decoding based on hard decision data and coarse data. In this case, because soft decision decoding may start at a time point at which hard decision data may be completely received from the memory device 120, a time to start soft decision decoding may be advanced. Accordingly, the performance of the storage device 100 may be improved.

In an embodiment, the coarse data may indicate a data pattern or a data set determined based on a status of the memory device 120 (e.g., at least one of a degradation state and a number of program/erase (P/E) cycles of the memory device 120). When the ECC engine 111 performs soft decision decoding using hard decision data and coarse data, an accuracy for a result of the soft decision decoding may be relatively low. However, the ECC engine 111 may iteratively perform soft decision decoding and may perform subsequent soft decision decoding based on soft decision data or compressed soft decision data received from the memory device 120. Accordingly, the accuracy of soft decision decoding may be overall maintained.

In an embodiment, the ECC engine 111 may iteratively perform soft decision decoding based on a low density parity check (LDPC) code. However, embodiments are not limited thereto. For example, in an embodiment, the ECC engine 111 may perform various encoding or decoding operations for correcting an error using at least one of an LDPC code, a Bose-Chaudhuri-Hocquenghem (BCH) code, a turbo code, a Reed-Solomon code, a coded modulation such as a trellis-coded modulation (TCM) or a block coded modulation (BCM), or various other codes or schemes.

Figure 2:
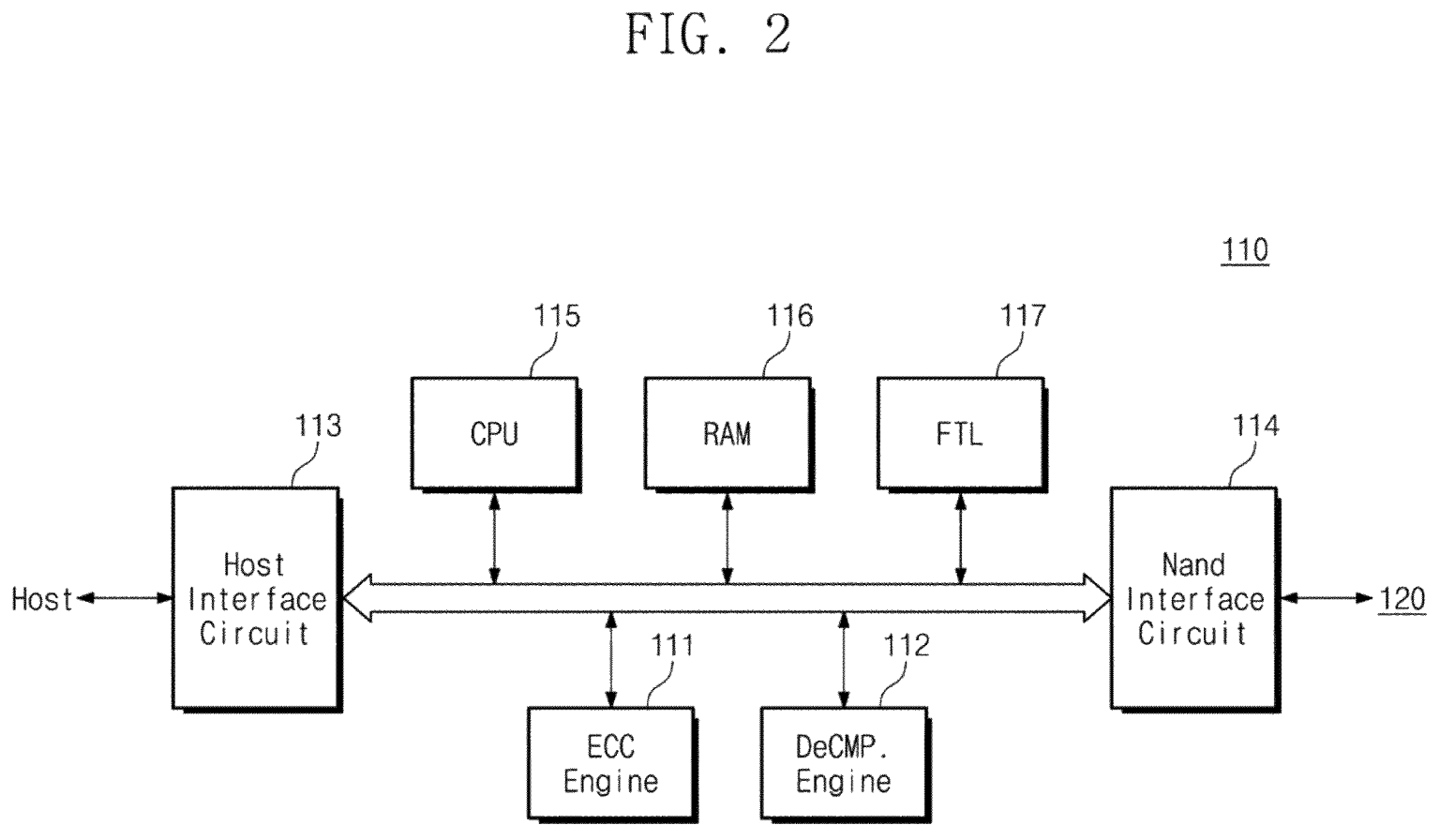

FIG. 2 is a block diagram illustrating a controller of FIG. 1. Referring to FIGS. 1 and 2, the controller 110 may include the ECC engine 111, a decompression engine 112, a host interface circuit 113, a NAND interface circuit 114, a central processing unit (CPU) 115, a random access memory (RAM) 116, and a flash translation layer (FTL) 117.

The ECC engine 111 may detect and correct an error in the data read from the memory device 120. Examples of the operation of the ECC engine 111 are described above and are also described in detail with reference to the following drawings.

The decompression engine 112 may perform decompression on data received from the memory device 120. For example, as described with reference to FIG. 1, the memory device 120 may compress soft decision data and may transmit the compressed soft decision data to the controller 110. The decompression engine 112 of the controller 110 may perform decompression on the compressed soft decision data to generate soft decision data. In an embodiment, the soft decision data generated through the decompression may be used for soft decision decoding of the ECC engine 111.

The host interface circuit 113 may communicate with an external host through or using a host interface. The host interface may include at least one of various host interfaces such as a peripheral component interconnect express (PCI-express) interface, a PCI-express based nonvolatile memory express (NVMe) interface, a serial advanced technology attachment (SATA) interface, a small computer system interface (SCSI), a serial attached SCSI (SAS) interface, a universal flash storage (UFS) interface, and a compute express link (CXL) interface.

The NAND interface circuit 114 may communicate with the memory device 120. In an embodiment, the NAND interface circuit 114 may be implemented to comply with a protocol such as Toggle or an open NAND flash interface (ONFI).

The CPU 115 may be configured to control an overall operation of the controller 110. For example, the CPU 115 may execute various applications on the controller 110. The RAM 116 may be configured to store various information used by the controller 110 to operate. In an embodiment, the RAM 116 may be used as at least one of a working memory, a cache memory, and a buffer memory of the controller 110. In an embodiment, the RAM 116 may be an ECC buffer configured to store data (e.g., hard decision data, soft decision data, and a decoding result) to be used by the ECC engine 111.

The FTL 117 may perform various maintenance operations for efficiently managing or using the memory device 120. The maintenance operations may include operations such as an address mapping operation, a wear-leveling operation, and a garbage collection operation.

The address mapping operation of the FTL 117 may refer to an operation of translating logical addresses received from the external host into physical addresses to be used to actually store data in the memory device 120. In an embodiment, the FTL 117 may perform the address mapping operation using L2P map data. The wear-leveling operation of the FTL 117 may refer to an operation of preventing excessive deterioration of a specific memory block among memory blocks included in the memory device 120. For example, the FTL 117 may allocate the memory blocks included in the memory device 120 so as to be used uniformly, and thus, the excessive deterioration of the specific memory block may be prevented. In an embodiment, the wear-leveling operation of the FTL 117 may be implemented through a firmware technology for balancing erase counts of the memory blocks of the memory device 120. The garbage collection operation of the FTL 117 may refer to an operation of securing a memory block or a capacity available in the memory devices 120 by copying valid data of a source memory block to a target memory block and erasing the source memory block or switching the source memory block into a free block. The FTL 117 may further perform various management operations such as a bad block management operation, in addition to the above operations. In an embodiment, some or all of the functions of the FTL 117 may be implemented through software, hardware, or a combination thereof.

Figure 3:
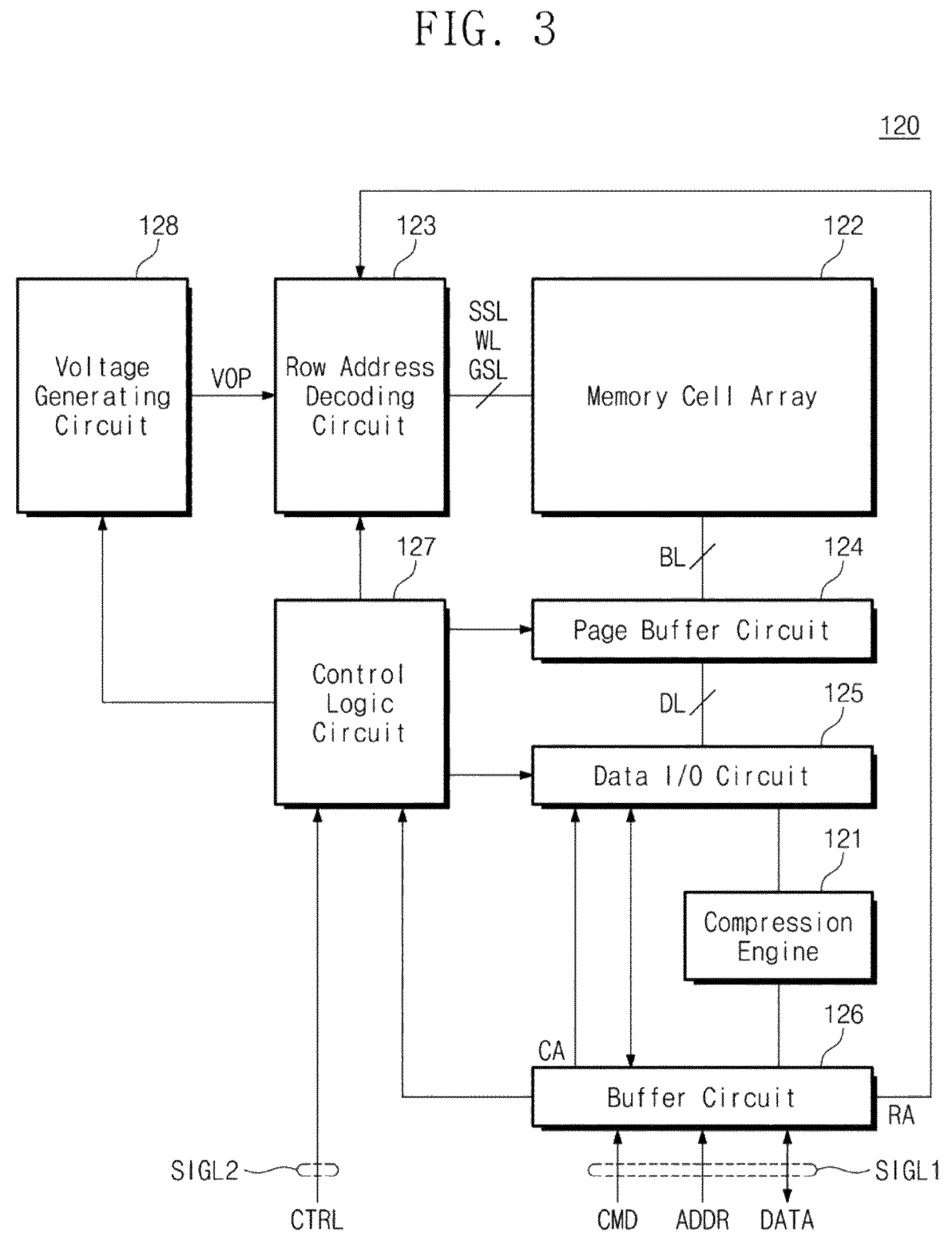

FIG. 3 is a block diagram illustrating a memory device of FIG. 1. Referring to FIGS. 1 and 3, the memory device 120 may include the compression engine 121, a memory cell array 122, a row address decoding circuit 123, a page buffer circuit 124, a data input/output (I/O) circuit 125, a buffer circuit 126, a control logic circuit 127, and a voltage generating circuit 128. In some embodiments, the compression engine 121 may be, or may include, a compression circuit.

The compression engine 121 may be configured to compress data read from the memory device 120 or the memory cell array 122. In an embodiment, the compression engine 121 may be configured to compress soft decision data. In an embodiment, the soft decision data may have a low-density data pattern including a relatively large number of specific bit values (e.g., a value of one ("1")). Accordingly, the soft decision data may be compressed with a relatively small size. In an embodiment, the compression engine 121 may compress the soft decision data based on a loss compression manner.

The memory cell array 122 may include a plurality of memory blocks. Each of the plurality of memory blocks may include a plurality of cell strings. Each of the plurality of cell strings may include a plurality of cell transistors stacked in a direction perpendicular to a substrate. The plurality of cell transistors may be connected in series between bit lines BL and a common source line. The plurality of cell transistors may be connected to string selection lines SSL, word lines WL, and ground selection lines GSL.

The row address decoding circuit 123 may be connected to the memory cell array 122 through the string selection lines SSL, the word lines WL, and the ground selection lines GSL. The row address decoding circuit 123 may operate under control of the control logic circuit 127. For example, under control of the control logic circuit 127, the row address decoding circuit 123 may decode a row address RA received from the buffer circuit 126; based on a decoding result, the row address decoding circuit 123 may control or drive the string selection lines SSL, the word lines WL, and the ground selection lines GSL or may control voltages applied to the string selection lines SSL, the word lines WL, and the ground selection lines GSL.

The page buffer circuit 124 may be connected to the memory cell array 122 through the bit lines BL. The page buffer circuit 124 may be connected to the data I/O circuit 125 through a plurality of data lines DL. The page buffer circuit 124 may operate under control of the control logic circuit 127. For example, in the program operation of the memory device 120, the page buffer circuit 124 may store data to be programmed in the memory cell array 122 under control of the control logic circuit 127. In the read operation of the memory device 120, the page buffer circuit 124 may sense voltages of the bit lines BL and may store the sensed results as read data.

In an embodiment, hard decision data and soft decision data may be generated through or during one read operation of the memory device 120. For example, the page buffer circuit 124 may include a plurality of latches for sensing voltage changes of the plurality of bit lines BL. The page buffer circuit 124 may store the hard decision data in a first latch (e.g., an S-latch) by sensing a voltage of a sensing node connected to each of the plurality of bit lines BL at a first time point. The page buffer circuit 124 may store soft decision data in a second latch (e.g., an F-latch) by sensing the voltage of the sensing node connected to each of the plurality of bit lines BL at each of a second time point and a third time point. In an embodiment, the first to third points in times may be different from each other. The method of reading the hard decision data and the soft decision data described above is provided as an example, and embodiments are not limited thereto.

The data I/O circuit 125 may be connected to the page buffer circuit 124 through the plurality of data lines DL. The data I/O circuit 125 may receive a column address CA from the buffer circuit 126. The data I/O circuit 125 may transmit the read data read by the page buffer circuit 124 to the buffer circuit 126 depending on the column Address CA. The data I/O circuit 125 may transmit data received from the buffer circuit 126 to the page buffer circuit 124 based on the column address CA.

In an embodiment, the data I/O circuit 125 may transmit the soft decision data received from the page buffer circuit 124 to the compression engine 121. The compression engine 121 may generate compressed soft decision data by compressing the soft decision data received from the data I/O circuit 125. The compressed soft decision data may be provided to the buffer circuit 126.

The buffer circuit 126 may receive the command CMD and the address ADDR through the first signal lines SIGL1 from the controller 110 and may exchange the data DATA with the controller 110 through the first signal lines SIGL1. In an embodiment, the first signal lines SIGL1 may be data signal lines (e.g., DQ lines).

The buffer circuit 126 may operate under control of the control logic circuit 127. For example, the control logic circuit 127 may exchange the control signals CTRL with the controller 110 through the second signal lines SIGL2. The control logic circuit 127 may control the buffer circuit 126 based on the control signals CTRL such that the buffer circuit 126 routes the command CMD, the address ADDR, and the data DATA. Under control of the control logic circuit 127, the buffer circuit 126 may identify signals received through the first signal lines SIGL1 as the command CMD or the address ADDR. The buffer circuit 126 may transfer the command CMD to the control logic circuit 127. The buffer circuit 126 may transfer the row address RA of the address ADDR to the row address decoding circuit 123 and may transfer the column address CA of the address ADDR to the data I/O circuit 125. The buffer circuit 126 may exchange the data DATA with the data I/O circuit 125.

The control logic circuit 127 may decode the command CMD received from the buffer circuit 126 and may control the memory device 120 or various components of the memory device 120 based on a decoding result.

Under control of the control logic circuit 127, the voltage generating circuit 128 may generate various operating voltages VOP which are used in the memory device 120. In an embodiment, the operating voltages VOP may include program voltages, pass voltages, selection read voltages, non-selection read voltages, erase voltages, and verify voltages.

Figure 4:
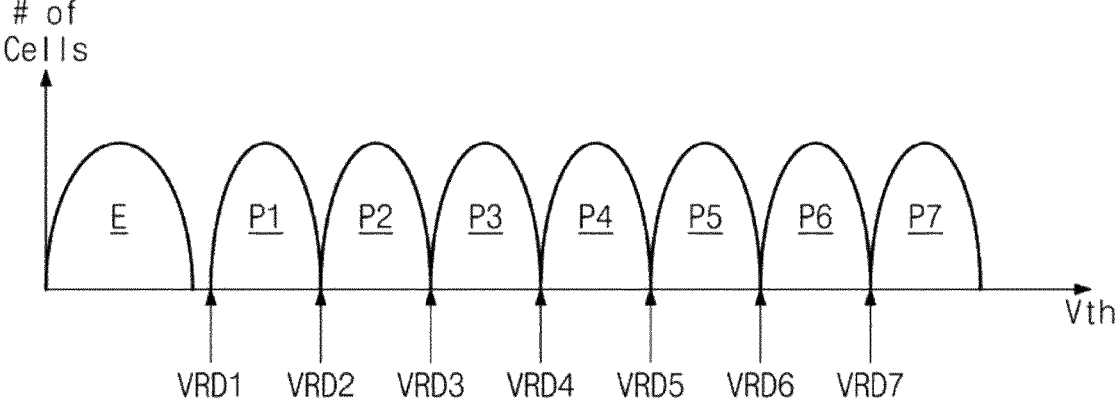
FIG. 4 is a diagram illustrating threshold voltage distributions of memory cells of a memory cell array of FIG. 3, according to an embodiment of the present disclosure.

FIG. 4 is a diagram illustrating threshold voltage distributions of memory cells of a memory cell array of FIG. 3. In an embodiment, each of the memory cells of the memory cell array 122 may be a triple level cell (TLC) configured to store 3 bits. However, embodiments are not limited thereto. For example, each of the memory cells may be a single level cell (SLC) configured to store one bit or may be a cell configured to store more than one bit, for example a multi-level cell (MLC), a triple-level cell (TLC), a quad-level cell (QLC), or a penta-level cell (PLC).

Referring to FIGS. 3 and 4, the memory cells included in the memory cell array 122 may be programmed to have one of an erase state E and a plurality of program states P1 to P7. A threshold voltage or a state of each memory cell may correspond to data or bits stored in each memory cell. The memory device 120 may determine threshold voltages or program states of memory cells by applying a plurality of read voltages VRD1 to VRD7 to a word line connected to the memory cells and may read data stored in the memory cells based on a determination result.

In an embodiment, threshold voltages of the memory cells may change due to various factors. In this case, an error may occur in the data read from the memory cells. Various error correction schemes may be used to detect and correct the error.

Figure 5A:
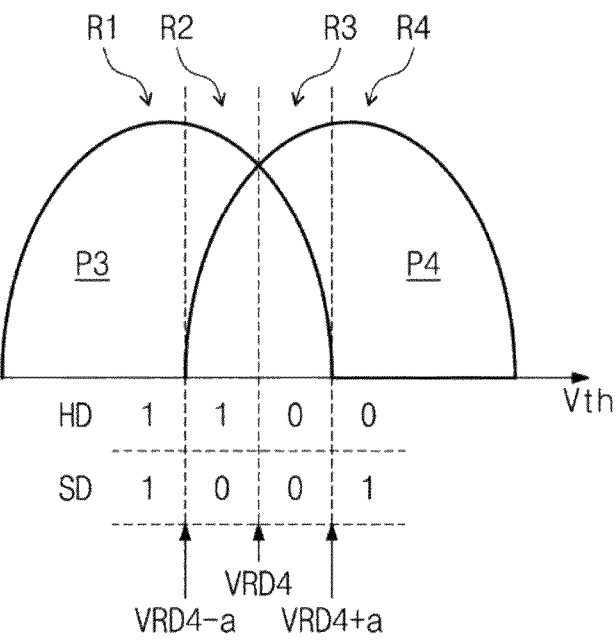
FIGS. 5A to 5C are diagrams for describing an operation of reading hard decision data and soft decision data from memory cells, according to an embodiment of the present disclosure.
Figure 5B:
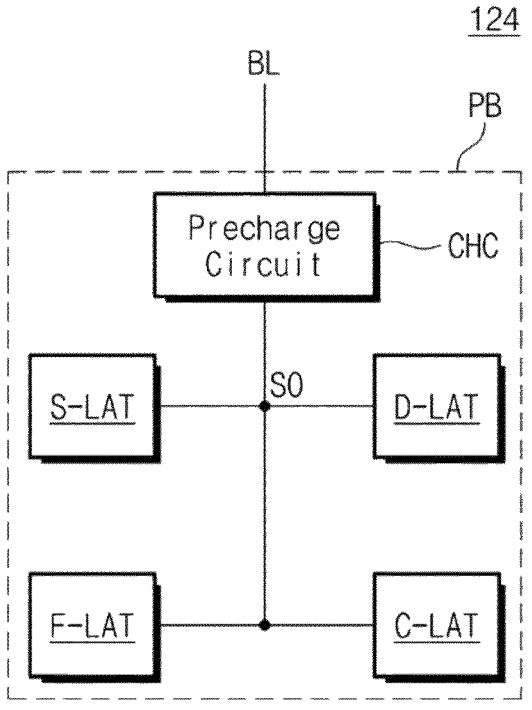
Figure 5C:
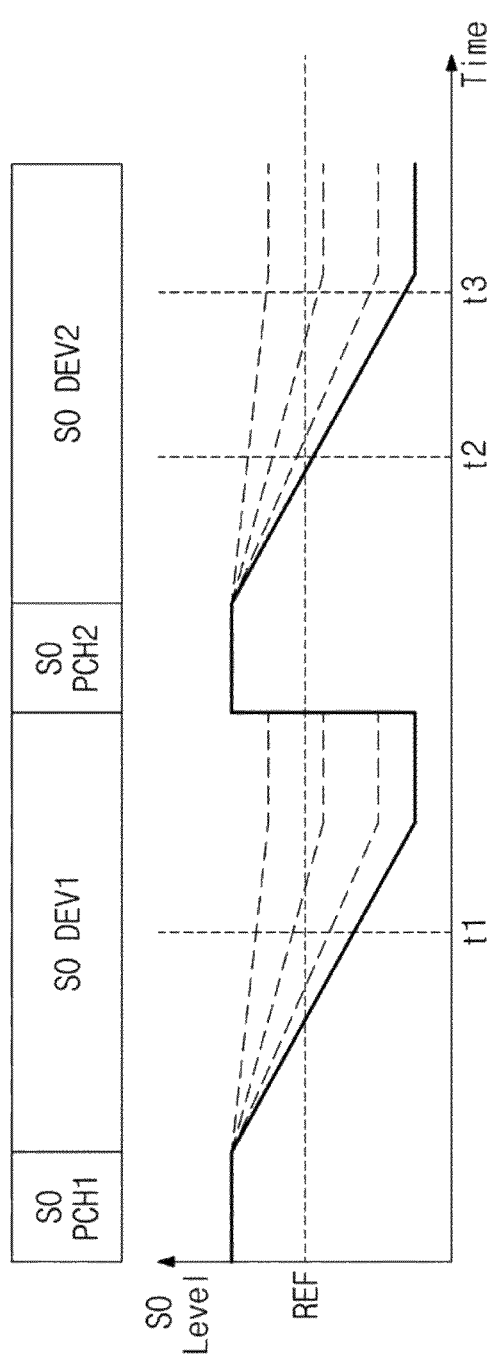

FIGS. 5A to 5C are diagrams for describing an operation of reading hard decision data and soft decision data from memory cells. For convenience of description, examples of an operation of reading hard decision data and soft decision data from memory cells having a third program state P3 and a fourth program state P4 are described with reference to FIGS. 5A to 5C. However, embodiments are not limited thereto. For example, an operation of reading hard decision data and soft decision data from memory cells having any other program states may be performed similarly.

Referring to FIGS. 3, 4, 5A, 5B, and 5C, the memory cells may be programmed to have one of the third and fourth program states P3 and P4. In this case, the memory device 120 may apply the fourth read voltage VRD4 to a selected word line to determine whether the memory cells have the third program state P3 or the fourth program state P4. In an embodiment, data corresponding to a memory cell whose threshold voltage is lower than the fourth read voltage VRD4 may be determined to have a value of one ("1"), and data corresponding to a memory cell whose threshold voltage is higher than the fourth read voltage VRD4 may be determined as to have a value of zero ("0").

In an embodiment, the data of the memory cells determined by the fourth read voltage VRD4 may be hard decision data HD. For example, the hard decision data HD may be data generated by distinguishing two adjacent program states (e.g., P3 and P4) using one read voltage (e.g., VRD4). In this case, the hard decision data HD may not reflect an error occurring in the memory cells. For example, a first memory cell may be programmed to the third program state P3. Afterwards, due to various factors, the threshold voltage of the first memory cell may be higher than the fourth read voltage VRD4. In this case, data corresponding to the first memory cell programmed to the third program state P3 may have a value of one ("1"), but the hard decision data HD may have a value of zero ("0"). In contrast, a second memory cell may be programmed to the fourth program state P4. Afterwards, due to various factors, the threshold voltage of the second memory cell may be lower than the fourth read voltage VRD4. In this case, data corresponding to the second memory cell programmed to the fourth program state P4 should have a value of zero ("0"), but the hard decision data HD may have a value of one ("1"). For example, due to various factors, the hard decision data HD read from the memory cells may include an error; in this case, the error may not be corrected by the ECC engine 111.

To supplement the hard decision data HD, the memory device 120 may read soft decision data SD from the memory cells. For example, the memory device 120 may detect memory cells, which have threshold voltages included in a range from (VRD4−a) to (VRD4+a), from among the memory cells. Bit values of soft decision data SD corresponding to memory cells having threshold voltages included in the range from (VRD4−a) to (VRD4+a) may be determined to have a value of zero ("0"), and bit values of soft decision data SD corresponding to memory cells having threshold voltages being out of the range from (VRD4−a) to (VRD4+a) may be determined to have a value of one ("1").

In an embodiment, memory cells for which the soft decision data SD is determined to have a value of one ("1") may be of a strong error type, and memory cells for which the soft decision data SD is determined to have a value of zero ("0") may be of a weak error type.

For example, an error may be absent from memory cells, for which the soft decision data SD is determined to have a value of one ("1") and the hard decision data HD is determined to have a value of one ("1"), from among the memory cells programmed to the third program state P3 (e.g., an error may be absent from memory cells of a first region R1). An error may be absent from memory cells, for which the soft decision data SD is determined to have a value of zero ("0") and the hard decision data HD is determined to have a value of one ("1"), from among the memory cells programmed to the third program state P3 (e.g., an error may be absent from memory cells of a second region R2). An error may occur in memory cells, for which the soft decision data SD is determined to have a value of zero ("0") and the hard decision data HD is determined to have a value of zero ("0"), from among the memory cells programmed to the third program state P3 (e.g., an error may be present in memory cells of a third region R3).

Likewise, an error may be absent from memory cells, for which the soft decision data SD is determined to have a value of one ("1") and the hard decision data HD is determined to have a value of zero ("0"), from among the memory cells programmed to the fourth program state P4 (e.g., an error may be absent from memory cells of a fourth region R4). An error may be absent from memory cells, for which the soft decision data SD is determined to have a value of zero ("0") and the hard decision data HD is determined to have a value of zero ("0"), from among the memory cells programmed to the fourth program state P4 (e.g., an error may be absent from the memory cells of the third region R3). An error may occur in memory cells, for which the soft decision data SD is determined to have a value of zero ("0") and the hard decision data HD is determined to have a value of one ("1"), from among the memory cells programmed to the fourth program state P4 (e.g., an error may occur in the memory cells of the second region R2).

According to the above description, the probability that an error occurs in the memory cells of the first and second regions R1 and R2 may be low, which may be referred to as a "strong error type". In contrast, the probability that an error occurs in the memory cells of the first and second regions R2 and R3 may exist, which may be referred to as a "weak error type".

As described above, the soft decision data SD may be used to determine whether an error is absent from the hard decision data HD read from the memory cells or whether there is a relatively high probability of occurrence of an error. Accordingly, because data with a relatively high error probability is capable of being identified, the ECC engine 111 of the controller 110 may improve an error correction capability by performing decoding (e.g., soft decision decoding) using the hard decision data HD and the soft decision data SD.

In an embodiment, the memory device 120 may read the soft decision data SD based on various schemes. For example, the memory device 120 may distinguish memory cells in the first region R1 from memory cells in the second to fourth regions R2 to R4 by applying the voltage of (VRD4−a) to the selected word line. Afterwards, the memory device 120 may distinguish memory cells in the first to third regions R1 to R3 from memory cells in the fourth region R4 by applying the voltage of (VRD4+a) to the selected word line. The memory device 120 may combine results of the above two read operations and may generate the soft decision data SD as illustrated in FIG. 5A.

In some embodiments, the memory device 120 may generate the hard decision data HD and the soft decision data SD through one read operation (e.g., using one read operation, or during one read operation). For example, the page buffer circuit 124 may include a plurality of page buffers respectively connected to a plurality of bit lines. FIG. 5B illustrates an example of one page buffer among the plurality of page buffers.

A page buffer PB of the page buffer circuit 124 may include a precharge circuit CHC and a plurality of latches S-LAT, F-LAT, D-LAT, and C-LAT. The precharge circuit CHC may be connected between the bit line BL and a sensing node SO and may be configured to precharge the bit line BL and the sensing node SO depending on an operation of the memory device 120. The plurality of latches S-LAT, F-LAT, D-LAT, and C-LAT may be configured to sense and store a voltage change of the sensing node SO or to control a voltage of the sensing node SO based on data stored therein.

For example, as illustrated in FIG. 5C, the page buffer circuit 124 may perform a first sensing node precharge operation SO PCH1, a first sensing node develop operation SO DEV1, a second sensing node precharge operation SO PCH2, and a second sensing node develop operation SO DEV2. In an embodiment, before the first sensing node precharge operation SO PCH1, at least one of the memory device 120 and the page buffer circuit 124 may perform a bit line precharge operation.

In the first sensing node precharge operation SO PCH1, the precharge circuit CHC of the page buffer PB may precharge the sensing node SO. In the first sensing node develop operation SO DEV1, the precharge circuit CHC of the page buffer PB may electrically connect the bit line BL and the sensing node SO. A voltage of the sensing node SO may decrease depending on a voltage level of the bit line BL. A slope at which the voltage level of the sensing node SO decreases may vary depending on a threshold voltage of a relevant memory cell and a voltage applied to a relevant word line. For example, based on the fourth read voltage VRD4 being applied to the selected word line, when the threshold voltage of the memory cell is included in the first region R1, the voltage level of the sensing node SO may decrease along the solid line illustrated in FIG. 5C. In this example, when the threshold voltage of the memory cell is included in the second region R2, the voltage level of the sensing node SO may decrease along the dash-dot line illustrated in FIG. 5C. In addition, in this example, when the threshold voltage of the memory cell is included in the first region R3, the voltage level of the sensing node SO may decrease along the dash-double-dot line illustrated in FIG. 5C. Further, in this example, when the threshold voltage of the memory cell is included in the fourth region R4, the voltage level of the sensing node SO may decrease along the dashed line illustrated in FIG. 5C.

According to embodiments, at a first time point t1, the page buffer PB may set a value of the S-latch S-LAT based on the level of the sensing node SO. For example, when the level of the sensing node SO is lower than a reference voltage REF at the first time point t1, the value of the S-latch S-LAT may be set to one ("1"). In the embodiment of FIGS. 5A and 5C, a value of the S-latch S-LAT corresponding to each of the memory cells included in the first and second regions R1 and R2 may be set to one ("1"). In an embodiment, the values stored in the S-latches S-LAT may be used as the hard decision data HD.

Afterwards, in the second sensing node precharge operation SO PCH2, the precharge circuit CHC of the page buffer PB may precharge the sensing node SO. In the second sensing node develop operation SO DEV2, the precharge circuit CHC of the page buffer PB may electrically connect the bit line BL and the sensing node SO. In this case, as in the above description, the voltage of the sensing node SO may decrease.

According to embodiments, at a second time point t2, the page buffer PB may set a value of the F-latch F-LAT based on the level of the sensing node SO. For example, when the level of the sensing node SO is lower than the reference voltage REF at the second time point t2, the value of the F-latch F-LAT may be set to one ("1"). In the embodiment of FIGS. 5A and 5C, a value of the F-latch F-LAT corresponding to each of the memory cells included in the fourth region R1 may be set to one ("1").

Afterwards, at a third time point t3, the page buffer PB may set a value of the F-latch F-LAT based on the level of the sensing node SO. For example, when the level of the sensing node SO is higher than the reference voltage REF at the third time point t3, the value of the F-latch F-LAT may be set to one ("1"). In the example shown in FIGS. 5A and 5C, a value of the F-latch F-LAT corresponding to each of the memory cells included in the fourth region R4 may be set to one ("1"). The values stored in the F-latches F-LAT may be used as the soft decision data SD.

As described above, according to an embodiment of the present disclosure, during one read operation, the hard decision data HD and the soft decision data SD may be read from the memory cells. The hard decision data HD and the soft decision data SD thus read may be provided to the controller 110.

The method of reading the hard decision data HD and the soft decision data SD described above is provided as an example, and embodiments are not limited thereto.

Figure 6:
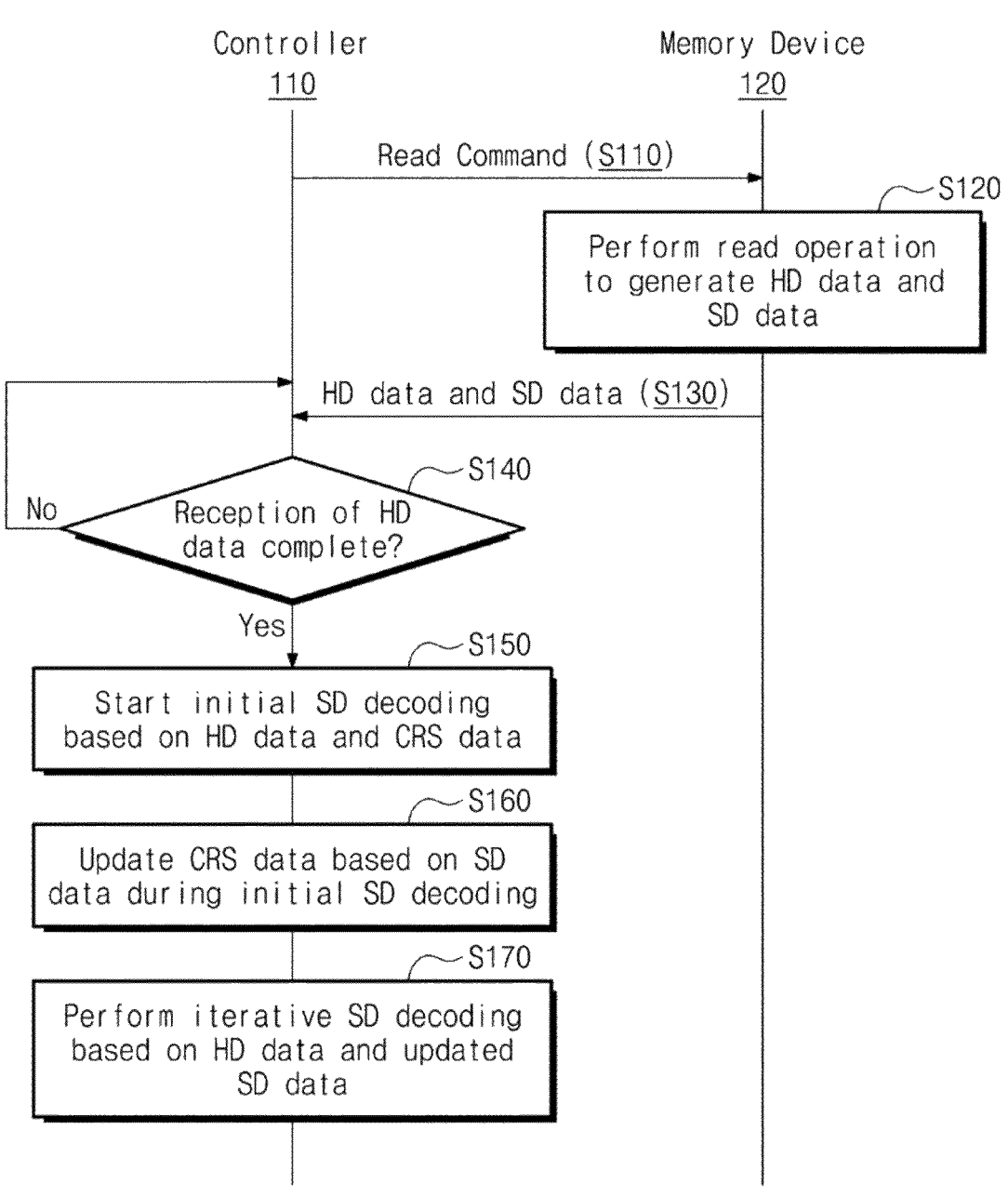
FIG. 6 is a flowchart illustrating an operation of a storage device of FIG. 1, according to an embodiment of the present disclosure.

FIG. 6 is a flowchart illustrating an operation of a storage device of FIG. 1. For convenience of description, additional description associated with the components described above may be omitted to avoid redundancy. Referring to FIGS. 1 and 6, at operation S110, the controller 110 may transmit a read command to the memory device 120. For example, the controller 110 may provide the memory device 120 with a read command for reading data from the memory device 120.

At operation S120, the memory device 120 may perform the read operation in response to the read command. For example, the memory device 120 may perform the read operation on memory cells connected to a selected word line in response to the read command and may generate the hard decision data HD and the soft decision data SD. Examples of the operation in which the hard decision data HD and the soft decision data SD are generated using the read operation are described above, and thus, additional description may be omitted to avoid redundancy.

At operation S130, the memory device 120 may transmit the hard decision data HD and the soft decision data SD to the controller 110. For example, under control of the controller 110, the memory device 120 may sequentially transmit the hard decision data HD and the soft decision data SD to the controller 110.

At operation S140, the controller 110 may determine whether the reception of the hard decision data HD is completed. In some embodiments, the controller 110 may determine whether all of the hard decision data HD is received. When the reception of the hard decision data HD is not completed ("No" at operation S140), the controller 110 may continue to perform operation S130 (e.g., continue to receive the hard decision data HD and the soft decision data SD).

When all of the hard decision data HD is determined to be received ("Yes" at operation S140), at operation S150, the controller 110 may start an initial soft decision decoding based on the hard decision data HD and coarse data CRS. For example, as described above, the controller 110 may sequentially receive the hard decision data HD and the soft decision data SD from the memory device 120. For example, even though the reception of the hard decision data HD may be completed, the reception of the soft decision data SD may not be yet completed. In this case, the ECC engine 111 of the controller 110 may first start the initial soft decision decoding using the coarse data CRS instead of the soft decision data SD which is not completely received. In an embodiment, the coarse data CRS may be a data pattern set in advance based on the status of the memory device 120. In an embodiment, the initial soft decision decoding may refer to soft decision decoding which may be performed before a first soft decision decoding included in the iterative soft decision decoding which is performed by the ECC engine 111. In some embodiments, the initial soft decision decoding may be referred to as, for example, preliminary soft decision decoding, zeroth soft decision decoding, and 0-th or $0^{th}$ soft decision decoding, but embodiments are not limited thereto.

At operation S160, the controller 110 may update the coarse data CRS based on the soft decision data SD received from the memory device 120, while performing the initial soft decision decoding. In an embodiment, operation S160 may be performed simultaneously, in parallel with, or independently from operation S130 and operation S150. For example, during initial soft decision decoding SD_DEC0, the controller 110 may replace the coarse data CRS with the received soft decision data SD or may update the coarse data CRS so that it is changed to the received soft decision data SD, based on a particular unit (e.g., a code word unit, a sector unit, or a page unit), while receiving the soft decision data SD from the memory device 120. In some embodiments, during the initial soft decision decoding SD_DEC0, the controller 110 may replace the coarse data CRS with the received soft decision data SD in real time or may update the coarse data CRS so that it is changed to the received soft decision data SD in real time, while receiving the soft decision data SD from the memory device 120.

At operation S170, the controller 110 may perform subsequent soft decision decoding or iterative soft decision decoding, based on the hard decision data HD and the updated soft decision data SD.

In general, because the soft decision decoding may use both the hard decision data HD and the soft decision data SD, the soft decision decoding may start after both the hard decision data HD and the soft decision data SD are received. In contrast, according to an embodiment of the present disclosure, at a time point when a reception of the hard decision data HD is completed (e.g., before all of the soft decision data SD is received), the ECC engine 111 of the controller 110 may start the initial soft decision decoding using the coarse data CRS. Accordingly, because a time point when the initial soft decision decoding starts is advanced, a time point when the ECC engine 111 completes decoding may be advanced. Accordingly, the overall performance of the storage device 100 is improved.

FIGS. 7A to 7E are diagrams for describing an operation of a storage device according to the flowchart of FIG. 6. As an example, referring to FIGS. 1 and 7A, during a time period from t0 to ta, the controller 110 may receive the hard decision data HD from the memory device 120. The received hard decision data HD may be stored in the ECC buffer. In an embodiment, the ECC buffer may be or may correspond to the RAM 116 included in the controller 110 of FIG. 2. In some embodiments, the ECC buffer may be a separate storage device for temporarily storing data received from the memory device 120 and may be located inside or outside of the controller 110.

After the hard decision data HD is stored in the ECC buffer, during a time period from ta to tb, the ECC engine 111 may perform iterative hard decision decoding HD_DEC0 to HD_DECk using the hard decision data HD. In an embodiment, the ECC engine 111 may iteratively perform hard decision decoding a predetermined number of times.

The iterative hard decision decoding may fail (or a result of an iterative hard decision decoding may indicate a decoding fail). In this case, during a time period from tb to tc, the controller 110 may receive the soft decision data SD from the memory device 120. The received soft decision data SD may be stored in the ECC buffer. In an embodiment, when the memory device 120 performs a separate operation for reading the soft decision data SD, a time used to read the soft decision data SD may be added between a time point when the hard decision decoding is completed to a time point when the reception of the soft decision data SD starts.

At the c-th time point tc when all of the soft decision data SD is received and is stored in the ECC buffer, the ECC engine 111 may start the initial soft decision decoding SD_DEC0 using the hard decision data HD and the soft decision data SD. Afterwards, the ECC engine 111 may continue subsequent soft decision decoding SD_DEC1 to SD_DECn. In an embodiment, the ECC engine 111 may iteratively perform soft decision decoding a predetermined number of times.

Below, for convenience of description, a configuration in which hard decision data or soft decision data is changed or modified by iterative decoding is omitted. However, embodiments are not limited thereto. For example, data stored in the ECC buffer may be changed by the iteration of decoding. For example, as hard decision decoding is iteratively performed, a result of previous hard decision decoding may be applied to the hard decision data HD. In some embodiments, as soft decision decoding is iteratively performed, a result of previous soft decision decoding may be applied to the soft decision data SD.

Figure 7A:
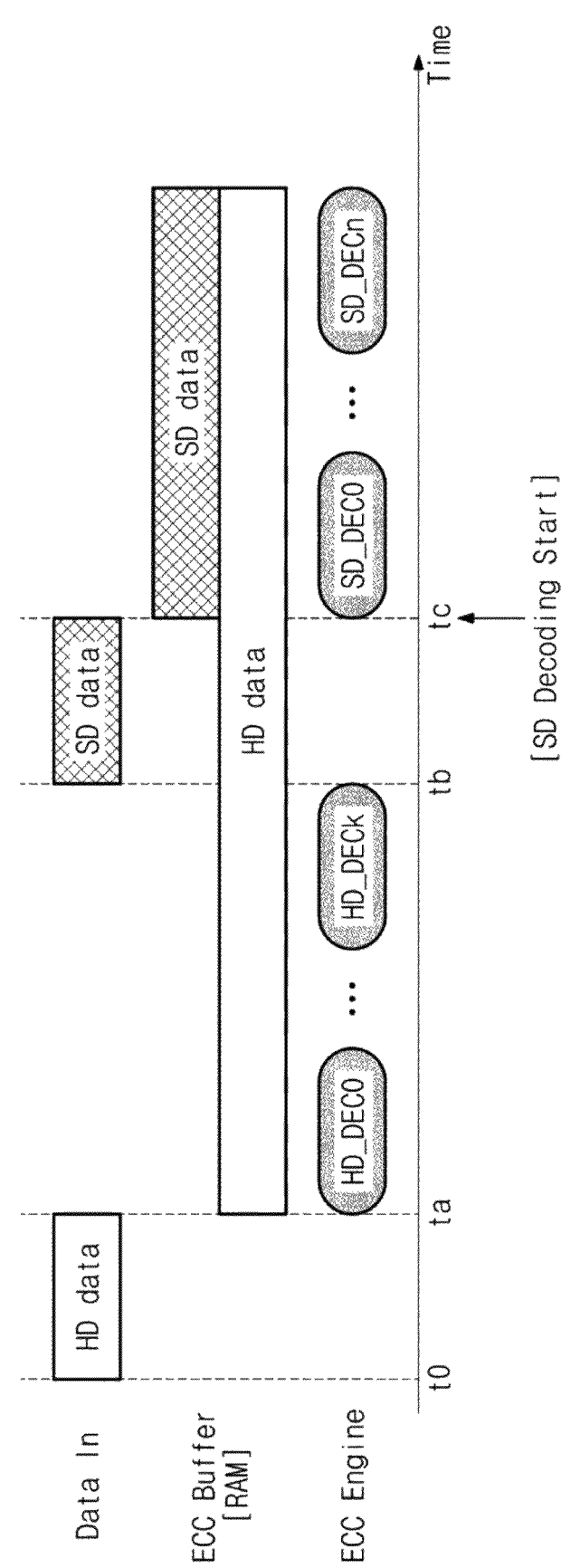
FIGS. 7A to 7E are diagrams for describing an operation of a storage device according to the flowchart of FIG. 6, according to an embodiment of the present disclosure.
Figure 7B:
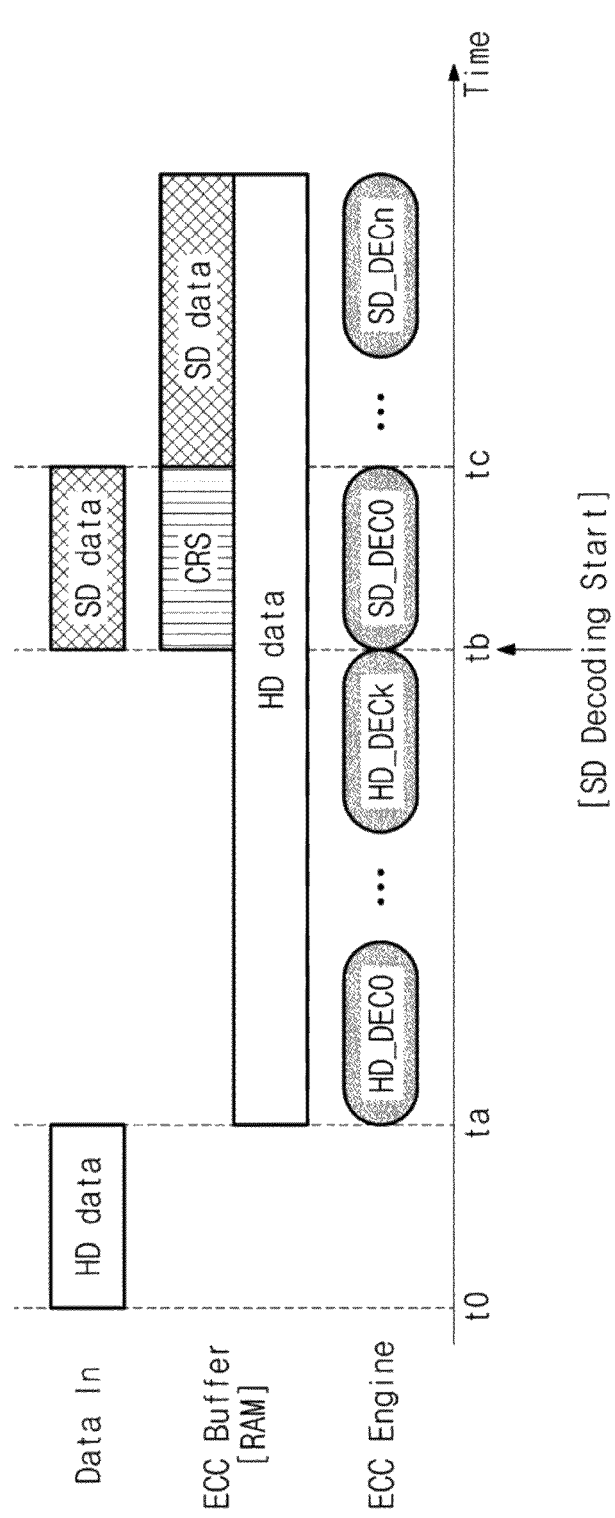

As another example, referring to FIGS. 1 and 7B, the controller 110 may receive the hard decision data HD from the memory device 120 and may perform the iterative hard decision decoding HD_DEC0 to HD_DECk. When the iterative hard decision decoding HD_DEC0 to HD_DECk fails (or when a result of the iterative hard decision decoding HD_DEC0 to HD_DECk indicates a decoding fail), at a b-th time point tb, the controller 110 may receive the soft decision data SD from the memory device 120. In this case, the controller 110 may start the initial soft decision decoding SD_DEC0 using the coarse data CRS while receiving the soft decision data SD from the memory device 120. For example, before the reception of the soft decision data SD is completed, at the b-th time point tb, the controller 110 may start the initial soft decision decoding SD_DEC0 using the coarse data CRS. After the reception of the soft decision data SD is completed, the coarse data CRS may be replaced with the soft decision data SD, and the ECC engine 111 may perform the subsequent soft decision decoding SD_DEC1 to SD_DECn using the hard decision data HD and the soft decision data SD. In this case, compared to the example illustrated in FIG. 7A, because the ECC engine 111 starts the initial soft decision decoding SD_DEC0 before the reception of the soft decision data SD is completed, a decoding start time point may be advanced.

Figure 7C:
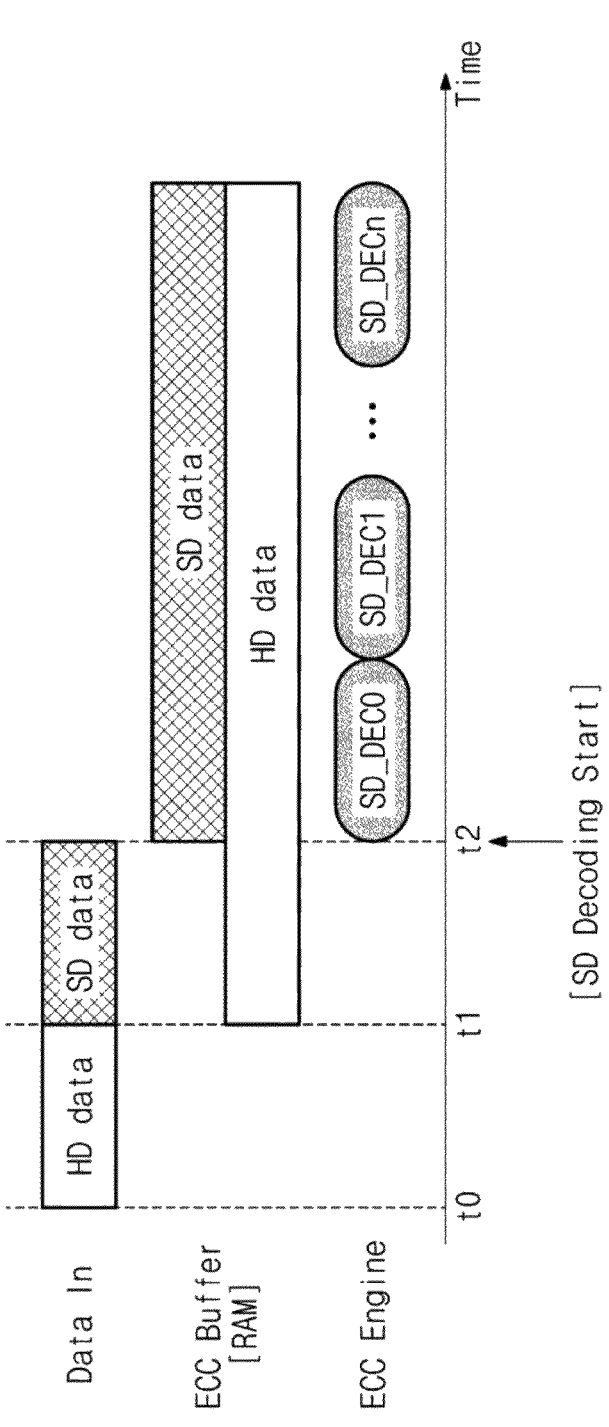

As yet another example, referring to FIGS. 1 and 7C, the controller 110 may sequentially receive the hard decision data HD and the soft decision data SD from the memory device 120. For example, under control of the controller 110, the memory device 120 may read the hard decision data HD and the soft decision data SD during one read operation. During a time period from t0 to t1, the controller 110 may receive the hard decision data HD from the memory device 120. The received hard decision data HD may be stored in the ECC buffer. Afterwards, during a time period from t1 to t2, the controller 110 may receive the soft decision data SD from the memory device 120. The received soft decision data SD may be stored in the ECC buffer.

After both the hard decision data HD and the soft decision data SD are stored in the ECC buffer, the ECC engine 111 of the controller 110 may start the initial soft decision decoding SD_DEC0. For example, at the second time point t2, both the hard decision data HD and the soft decision data SD may be received and may be stored in the ECC buffer. In this case, the ECC engine 111 may perform the iterative soft decision decoding SD_DEC0 to SD_DECn using the hard decision data HD and the soft decision data SD.

As described above, in the example illustrated in FIG. 7C, the controller 110 may sequentially receive the hard decision data HD and the soft decision data SD from the memory device 120. Accordingly, compared to the example illustrated in FIG. 7A, a soft decision decoding start time point in the example illustrated in FIG. 7C may be advanced.

Figure 7D:
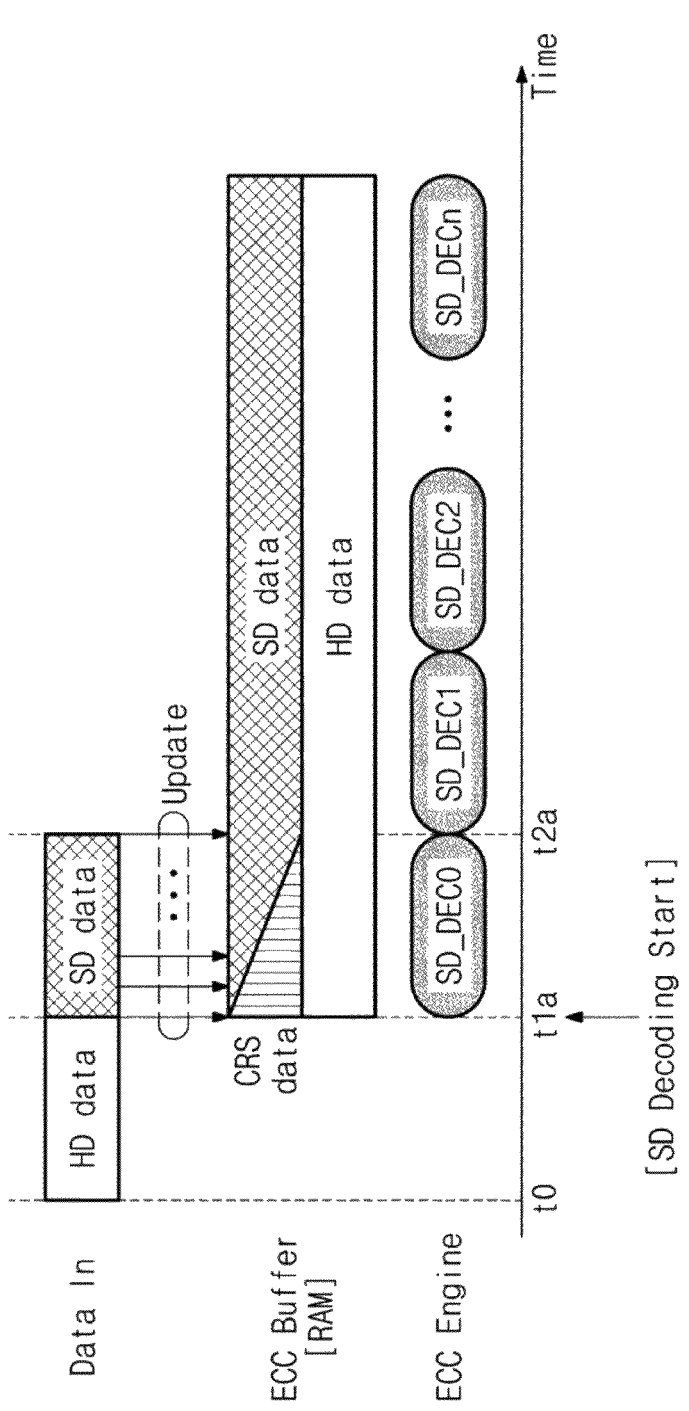
Figure 7E:
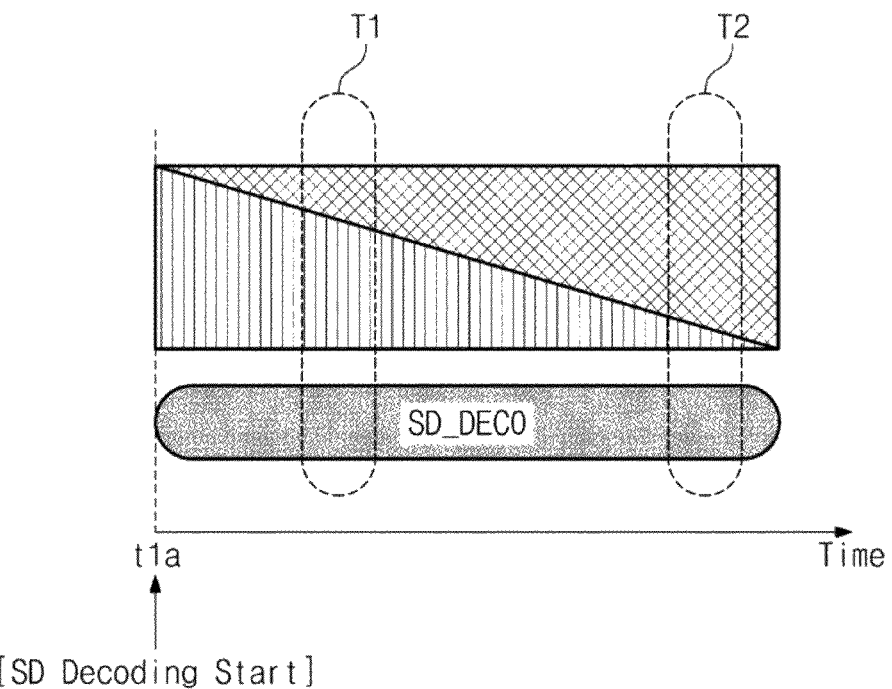

Below, an example of an operating method of the storage device 100 according to the flowchart of FIG. 6 is described in detail with reference to FIG. 7D. Referring to FIGS. 1 and 7D, the controller 110 may sequentially receive the hard decision data HD and the soft decision data SD from the memory device 120. For example, under control of the controller 110, the memory device 120 may read the hard decision data HD and the soft decision data SD through one read operation. During a time period from t0 to t1a, the controller 110 may receive the hard decision data HD from the memory device 120. The received hard decision data HD may be stored in the ECC buffer.

At the 1a-th time point t1a when the hard decision data HD is completely received, the ECC engine 111 of the controller 110 may start the initial soft decision decoding SD_DEC0 using the hard decision data HD and the coarse data CRS. For example, based on the hard decision data HD being stored in the ECC buffer, the ECC engine 111 may start the initial soft decision decoding SD_DEC0 using the hard decision data HD and the coarse data CRS.

For example, during a time period from t1a to t2a, the controller 110 may receive the soft decision data SD from the memory device 120. For example, even though all of the soft decision data SD is not yet received, the ECC engine 111 may start the initial soft decision decoding SD_DEC0 using the coarse data CRS instead of the soft decision data SD. In this case, because soft decision decoding is performed at a time point when the hard decision data HD is completely received, compared to the embodiment of FIG. 7C, a time point when soft decision decoding starts may be advanced.

In an embodiment, during the time period from t1a to t2a (e.g., while the initial soft decision decoding SD_DEC0 is performed), the controller 110 may receive the soft decision data SD from the memory device 120. In this case, the controller 110 may update the coarse data CRS, based on the received soft decision data SD. For example at the 2a-th time point t2a when the reception of the soft decision data SD is completed, the coarse data CRS may be replaced with the soft decision data SD or may be updated to be changed to the soft decision data SD. Accordingly, the subsequent soft decision decoding (e.g., SD_DEC1 to SD_DECn) may be performed using the hard decision data HD and the soft decision data SD.

In an embodiment, the operation in which the coarse data CRS is changed to the soft decision data SD may be performed during the initial soft decision decoding SD_DEC0. For example, referring to FIG. 7E, at the 1a-th time point t1a, the ECC engine 111 may start the initial soft decision decoding SD_DEC0 using the coarse data CRS. At the same time, the controller 110 may begin receiving, or continue receiving, the soft decision data SD from the memory device 120. While soft decision decoding is performed, the coarse data CRS may be replaced with the received soft decision data SD by a given unit, or in real time. For example as the initial soft decision decoding SD_DEC0 is performed and the soft decision data SD is received, the coarse data CRS may be replaced with the soft decision data SD or may converge into the soft decision data SD.

In an embodiment, at an initial time point (e.g., T1) of the first soft decision decoding, because a ratio of the coarse data CRS to the soft decision data SD may be relatively high, a result of the initial soft decision decoding SD_DEC0 may be relatively inaccurate. In contrast, as the coarse data CRS is updated, at a later time point (e.g., T2) of the initial soft decision decoding SD_DEC0, because a ratio of the soft decision data SD to the coarse data CRS may be relatively high, the result of the initial soft decision decoding SD_DEC0 may be relatively accurate. Also, in the subsequent soft decision decoding SD_DEC1 to SD_DECn iteratively performed, because the soft decision data SD received from the memory device 120 may be used, soft decision decoding may be overall normally performed.

As described above, according to an embodiment of the present disclosure, the controller 110 may sequentially receive the hard decision data HD and the soft decision data SD from the memory device 120. In this case, at a time point when the reception of the hard decision data HD is completed, the ECC engine 111 of the controller 110 may start the initial soft decision decoding SD_DEC0 (or the preliminary soft decision decoding or the initial soft decision decoding) using the hard decision data HD and the coarse data CRS. Accordingly, before the soft decision data SD is received, because the ECC engine 111 may be capable of starting the initial soft decision decoding SD_DEC0, a time point when the decoding of the ECC engine 111 is completed may be advanced. Accordingly, the overall performance of the storage device 100 may be improved.

Figure 8:
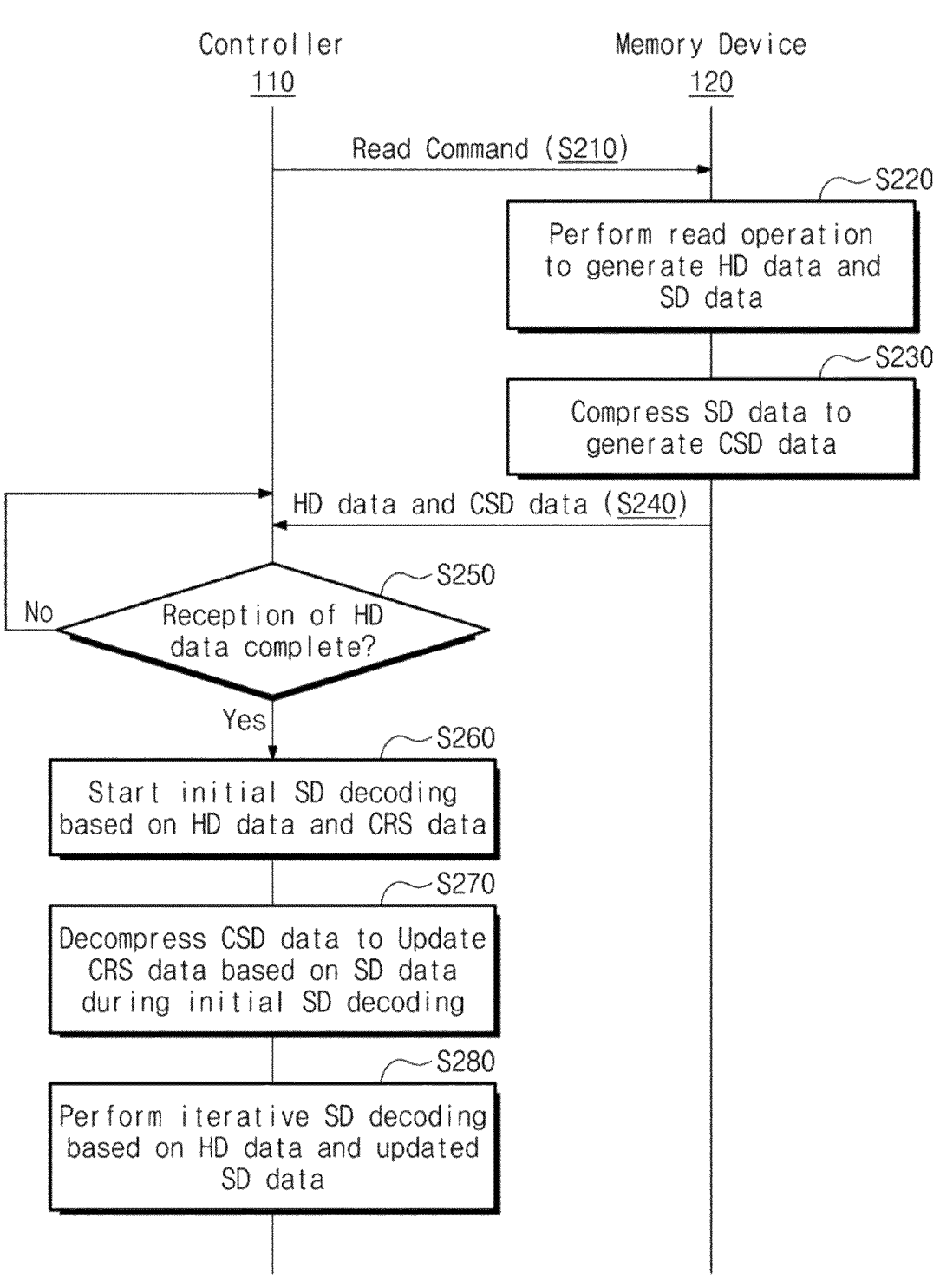
FIG. 8 is a flowchart illustrating an operation of a storage device of FIG. 1, according to an embodiment of the present disclosure.

FIG. 8 is a flowchart illustrating an operation of a storage device of FIG. 1. For convenience of description, additional description associated with the components described above may be omitted to avoid redundancy. Referring to FIGS. 1 and 8, at operation S210, the controller 110 may transmit the read command to the memory device 120. At operation S220, the memory device 120 may perform the read operation in response to the read command. The memory device 120 may perform the read operation to generate the hard decision data HD and the soft decision data SD.

At operation S230, the memory device 120 may compress the soft decision data SD to generate compressed soft decision data CSD. For example, as described with reference to FIGS. 1 and 3, the memory device 120 may include the compression engine 121. The compression engine 121 may compress the soft decision data SD to generate the compressed soft decision data CSD. In an embodiment, the soft decision data SD may include a specific pattern. For example, when a relatively large number of memory cells have the strong error type, there may be a relatively large number of bits corresponding to a value of one ("1") from among bits included in the soft decision data SD. In contrast, when a relatively large number of memory cells have the weak error type, there may be a relatively large number of bits corresponding to a value of zero ("0") from among bits included in the soft decision data SD. In general, memory cells having the strong error type may be relatively common. Accordingly, the compression engine 121 may generate the compressed soft decision data CSD based on a characteristic of the soft decision data SD. In an embodiment, the compression engine 121 may perform the compression operation based on the loss compression manner.

At operation S240, the memory device 120 may sequentially transmit the hard decision data HD and the compressed soft decision data CSD to the controller 110.

At operation S250, the controller 110 may determine whether the reception of the hard decision data HD is completed. In some embodiments, the controller 110 may determine whether all of the hard decision data HD is received. When the reception of the hard decision data HD is not completed ("No" at operation S250), the controller 110 may continue to perform operation S240 (e.g., continue to receive the hard decision data HD and the compressed soft decision data CSD).

When all of the hard decision data HD is determined to be received ("Yes" at operation S250), at operation S260, the controller 110 may start the initial soft decision decoding using the hard decision data HD and the coarse data CRS. Operation S260 may be similar to operation S150, and thus, additional description may be omitted to avoid redundancy.

At operation S270, the controller 110 may decompress the compressed soft decision data CSD received from the memory device 120 to generate the soft decision data SD and may update the coarse data CRS based on the soft decision data SD. In an embodiment, operation S270 may be performed simultaneously, in parallel with, or independently from operation S240 and operation S260. Operation S270 may be similar to operation S160 of FIG. 6 except for the operation of decompressing the compressed soft decision data CSD, and thus, additional description may be omitted to avoid redundancy.

At operation S280, the controller 110 may perform iterative soft decision decoding (or subsequent soft decision decoding), based on the hard decision data HD and the updated soft decision data SD. Operation S280 may be similar to operation S170 of FIG. 6, and thus, additional description may be omitted to avoid redundancy.

Figure 9A:
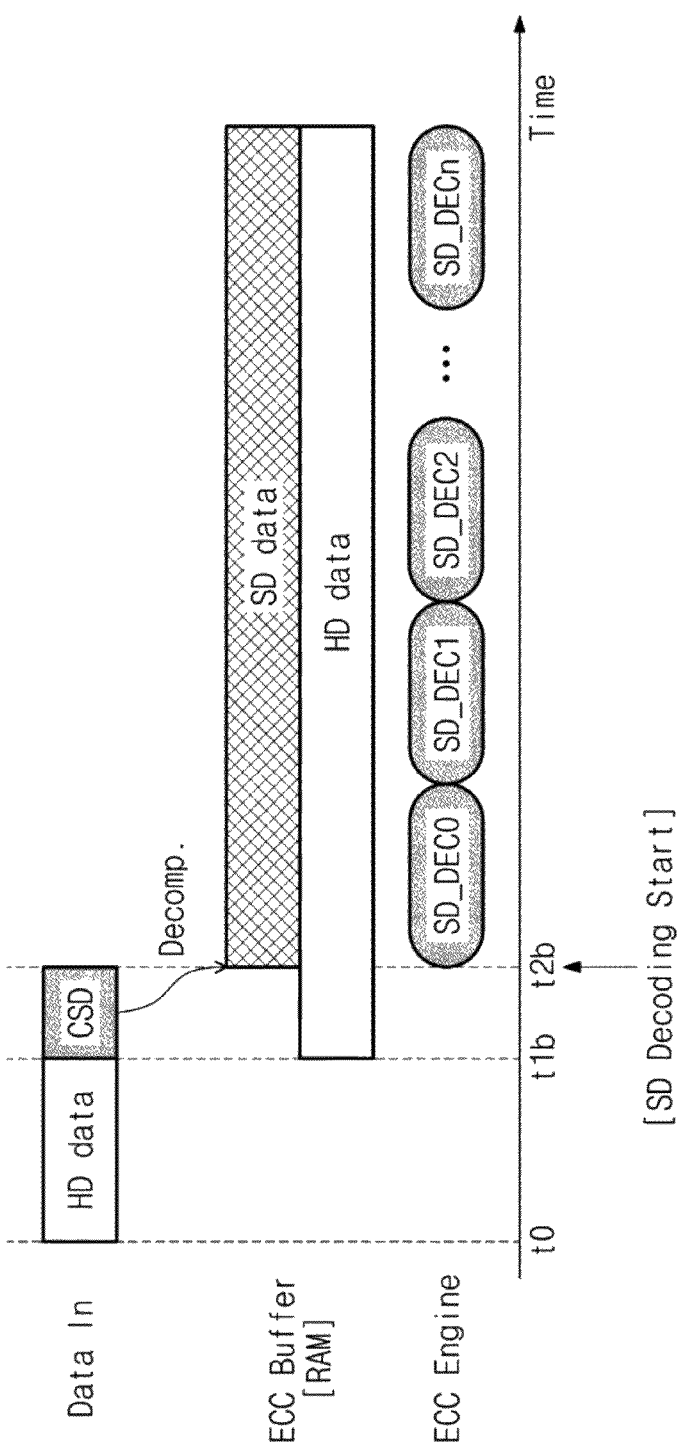
FIGS. 9A and 9B are diagrams for describing an operation of a storage device according to the flowchart of FIG. 8, according to an embodiment of the present disclosure.
Figure 9B:
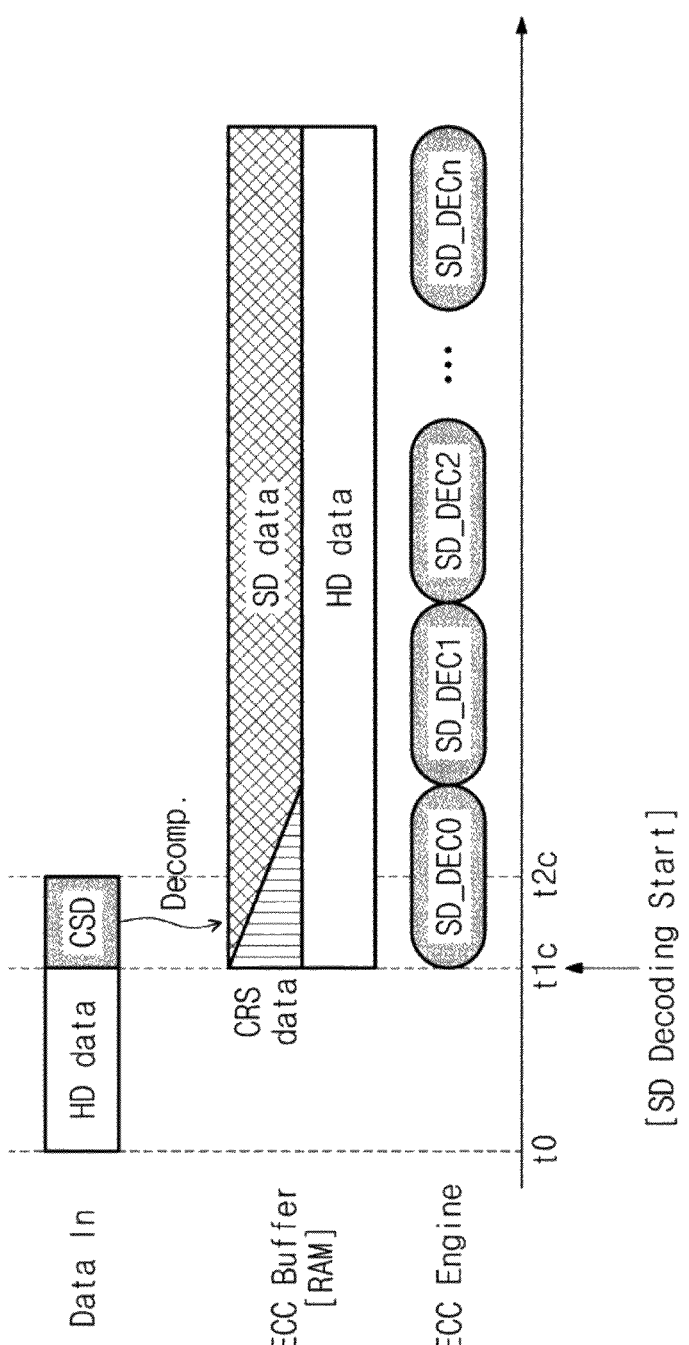

FIGS. 9A and 9B are diagrams for describing an operation of a storage device according to the flowchart of FIG. 8. For example, referring to FIGS. 1 and 9A, the controller 110 may sequentially receive the hard decision data HD and the compressed soft decision data CSD from the memory device 120. For example, under control of the controller 110, the memory device 120 may read the hard decision data HD and the soft decision data SD during one read operation. The memory device 120 may generate the compressed soft decision data CSD by compressing the soft decision data SD using the compression engine 121. The memory device 120 may sequentially transmit the hard decision data HD and the compressed soft decision data CSD to the controller 110.

During a time period from t0 to t1b, the controller 110 may receive the hard decision data HD from the memory device 120, and the received hard decision data HD may be stored in the ECC buffer. During a time period from t0b to t2b, the controller 110 may receive the compressed soft decision data CSD from the memory device 120. The controller 110 may decompress the compressed soft decision data CSD to generate the soft decision data SD, and the generated soft decision data SD may be stored in the ECC buffer. In an embodiment, because the compressed soft decision data CSD having a relatively small size may be transmitted from the memory device 120 to the controller 110, a time used to transmit data may be shortened.

At the 2b-th time point t2b when both the hard decision data HD and the soft decision data SD are stored in the ECC buffer, the ECC engine 111 of the controller 110 may start the initial soft decision decoding SD_DEC0 using the hard decision data HD and the soft decision data SD. Afterwards, the ECC engine 111 may perform subsequent soft decision decoding SD_DEC1 to SD_DECn.

As another example, referring to FIGS. 1 and 9B, the controller 110 may sequentially receive the hard decision data HD and the compressed soft decision data CSD from the memory device 120. A configuration for sequentially receiving the hard decision data HD and the compressed soft decision data CSD may be similar to that described with reference to FIG. 9A, and thus, additional description may be omitted to avoid redundancy.

At a time point t1c when the hard decision data HD is completely received (or at a time point when the hard decision data HD is completely stored in the ECC buffer), the controller 110 may start the initial soft decision decoding SD_DEC0. For example, at the 1c-th time point t1c, the ECC engine 111 of the controller 110 may start the initial soft decision decoding SD_DEC0 based on the hard decision data HD and the coarse data CRS. Accordingly, because the ECC engine 111 starts the initial soft decision decoding SD_DEC0 before the compressed soft decision data CSD is received, a time point when soft decision decoding starts may be advanced.

In an embodiment, during a time period from t1c to t2c, the controller 110 may receive the compressed soft decision data CSD from the memory device 120. The controller 110 may decompress the compressed soft decision data CSD to generate the soft decision data SD. While the initial soft decision decoding SD_DEC0 is performed, the controller 110 may update the coarse data CRS based on the soft decision data SD. The ECC engine 111 may perform the subsequent soft decision decoding SD_DEC1 to SD_DECn using the updated soft decision data SD. In an embodiment, a configuration for updating the coarse data CRS may be similar to that described with reference to FIGS. 7D and 7E except that the controller 110 may decompress the compressed soft decision data CSD, and thus, additional description may be omitted to avoid redundancy.

As described above, the controller 110 may sequentially receive the hard decision data HD and the compressed soft decision data CSD from the memory device 120. At a time point when the reception of the hard decision data HD is completed, the ECC engine 111 of the controller 110 may start the initial soft decision decoding SD_DEC0 based on the hard decision data HD and the coarse data CRS. While the initial soft decision decoding SD_DEC0 is performed, the controller 110 may decompress the compressed soft decision data CSD received from the memory device 120 to generate the soft decision data SD and may update or replace the coarse data CRS based on the soft decision data SD.

Accordingly, a decoding start time point may be advanced while the overall decoding performance may be maintained.

Figure 10:
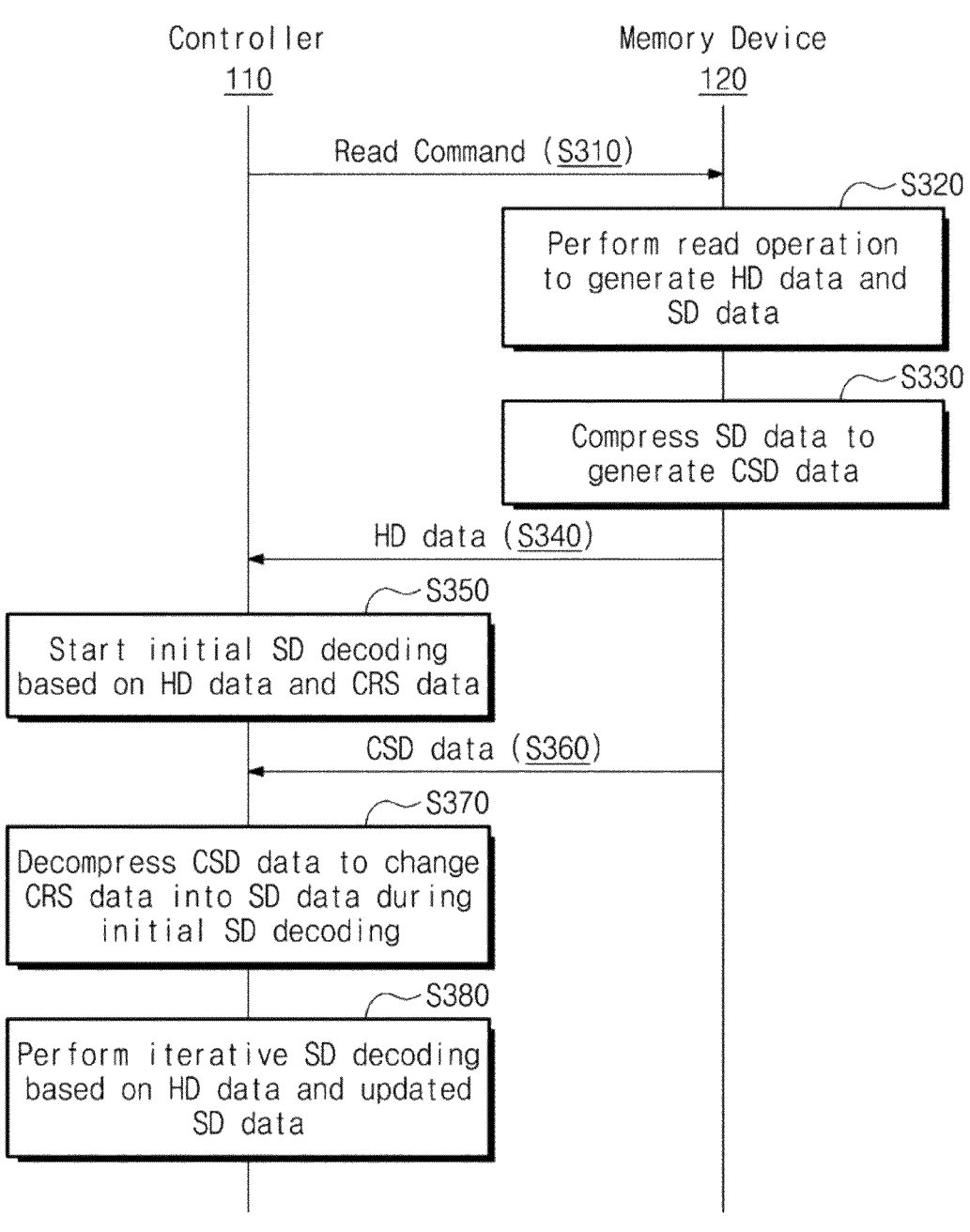
FIG. 10 is a flowchart illustrating an operation of a storage device of FIG. 1, according to an embodiment of the present disclosure.

FIG. 10 is a flowchart illustrating an operation of a storage device of FIG. 1. For convenience of description, additional description associated with the components described above may be omitted to avoid redundancy. Referring to FIGS. 1 and 10, the controller 110 and the memory device 120 may perform operation S310 to operation S330. Operation S310 to operation S330 may be similar to operation S210 to operation S230 of FIG. 8, and thus, additional description may be omitted to avoid redundancy.

At operation S340, the memory device 120 may transmit the hard decision data HD to the controller 110. At operation S350, the controller 110 may perform the initial soft decision decoding SD_DEC0, based on the hard decision data HD and the coarse data CRS. At operation S360, the memory device 120 may transmit the compressed soft decision data CSD to the controller 110. At operation S370, the controller 110 may generate the soft decision data SD by decompressing the compressed soft decision data CSD while the initial soft decision decoding SD_DEC0 is performed and may replace the coarse data CRS with the soft decision data SD. At operation S380, the controller 110 may perform subsequent soft decision decoding, based on the hard decision data HD and the soft decision data SD.

In an embodiment, operation S340 and operation S360 may be sequentially performed. In an embodiment, operation S360 and operation S370 may be sequentially performed. For example, in the example illustrated in FIG. 8, the controller 110 may receive the compressed soft decision data CSD from the memory device 120 while the initial soft decision decoding SD_DEC0 is performed; while the compressed soft decision data CSD is received, the controller 110 may decompress the compressed soft decision data CSD to update the coarse data CRS. In contrast, in the example shown in FIG. 9, the controller 110 may receive the compressed soft decision data CSD from the memory device 120 while the initial soft decision decoding SD_DEC0 is performed; after all of the compressed soft decision data CSD is received, the controller 110 may decompress the compressed soft decision data CSD to replace the coarse data CRS with the soft decision data SD.

Figure 11:
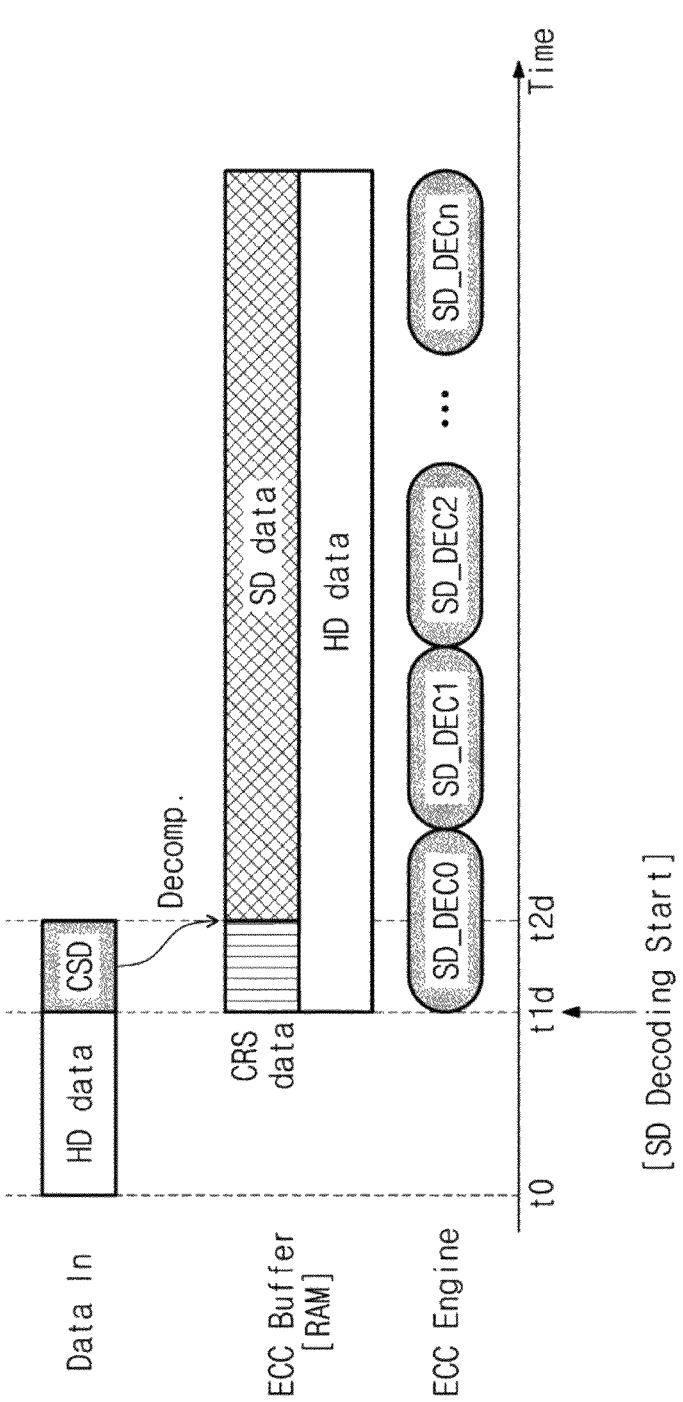
FIG. 11 is a diagram for describing an operation according to the flowchart of FIG. 10, according to an embodiment of the present disclosure.

FIG. 11 is a diagram for describing an operation according to the flowchart of FIG. 10. Referring to FIGS. 1, 10, and 11, the controller 110 may receive the hard decision data HD and the compressed soft decision data CSD from the memory device 120. A configuration for receiving the hard decision data HD and the compressed soft decision data CSD may be similar to that described with reference to FIG. 9B, and thus, additional description may be omitted to avoid redundancy.

As in the above description given with reference to FIG. 9B, at a 1d-th time point t1$d$ when the reception of the hard decision data HD is completed, the ECC engine 111 of the controller 110 may start the initial soft decision decoding SD_DEC0 using the hard decision data HD and the coarse data CRS.

In contrast with the example illustrated in FIG. 9B, in the example shown in FIG. 11, after receiving all of the compressed soft decision data CSD, the controller 110 may decompress the compressed soft decision data CSD and may replace the coarse data CRS with the soft decision data SD. For example, the reception of the compressed soft decision data CSD may be completed at a 2d-th time point t2$d$. At the 2d-th time point t2$d$, the controller 110 may decompress the compressed soft decision data CSD and may replace the coarse data CRS with the soft decision data SD. In this case, at the time period from t1$d$ to t2$d$, the ECC engine 111 performs the initial soft decision decoding SD_DEC0 using the hard decision data HD and the coarse data CRS. After the 2d-th time point t2$d$, the ECC engine 111 of the controller 110 may continuously perform the remaining portion of the initial soft decision decoding SD_DEC0 using the hard decision data HD and the soft decision data SD.

As described above, according to an embodiment of the present disclosure, the ECC engine 111 of the controller 110 may start the initial soft decision decoding SD_DEC0 (or the initial soft decision decoding) using the coarse data CRS, before the soft decision data SD or the compressed soft decision data CSD are received from the memory device 120. Accordingly, a time point when the ECC engine 111 starts decoding may be advanced. This may mean that a time point when all decoding operations are completed may be advanced. Accordingly, the performance of the storage device 100 may be improved.

Figure 12:
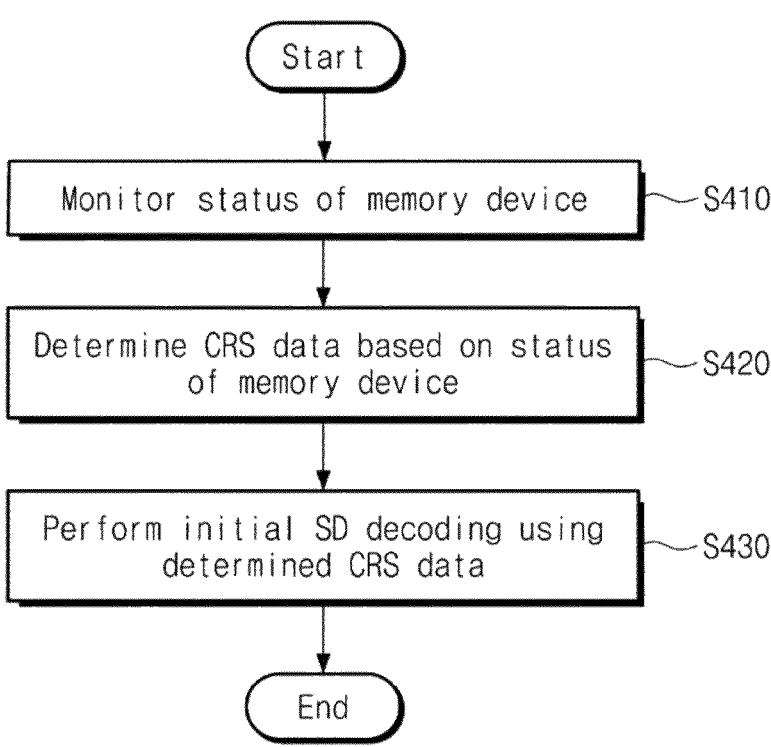
FIG. 12 is a flowchart illustrating an operation of a controller of FIG. 1, according to an embodiment of the present disclosure.

FIG. 12 is a flowchart illustrating an operation of a controller of FIG. 1. Referring to FIGS. 1 and 12, at operation S410, the controller 110 may monitor the status of the memory device 120. For example, the status of the memory device 120 may include information such as a deterioration level, a lifetime, and the number of P/E cycles. The controller 110 may monitor or manage the deterioration level of the memory device 120, based on a decoding result of the ECC engine 111. In some embodiments, the controller 110 may monitor or manage the deterioration level of the memory device 120, based on the soft decision data SD received from the memory device 120. In some embodiments, the controller 110 may monitor or manage information about the lifetime of the memory device 120 based on the number of P/E cycles of the memory device 120. The configuration for monitoring the status of the memory device 120 described above is provided only as an example, and embodiments are not limited thereto. For example, in embodiments, the controller 110 may monitor or manage the status of the memory device 120 in units of memory cell, word line, sub-block, memory block, super block, or plane.

At operation S420, the controller 110 may determine the coarse data CRS based on the status of the memory device 120. For example, the soft decision data SD may have a value corresponding to the error status of memory cells. In this case, the status of the memory cells may be affected by factors such as a deterioration level, a lifetime, and the number of P/E cycles. The coarse data CRS may refer to a data pattern or a data set which may be used in the initial soft decision decoding SD_DEC0 (e.g., the initial soft decision decoding) instead of the soft decision data SD, as described above. For example the pattern of the coarse data CRS may change depending on the status of the memory device 120. Accordingly, the accuracy of the initial soft decision decoding SD_DEC0 may be improved. In an embodiment, a plurality of patterns associated with the coarse data CRS may be managed in the form of a lookup table, and the controller 110 may select an optimal pattern as the coarse data CRS, based on the status of the memory device 120.

At operation S430, the controller 110 may perform the initial soft decision decoding SD_DEC0, based on the determined coarse data CRS.

Figure 13:
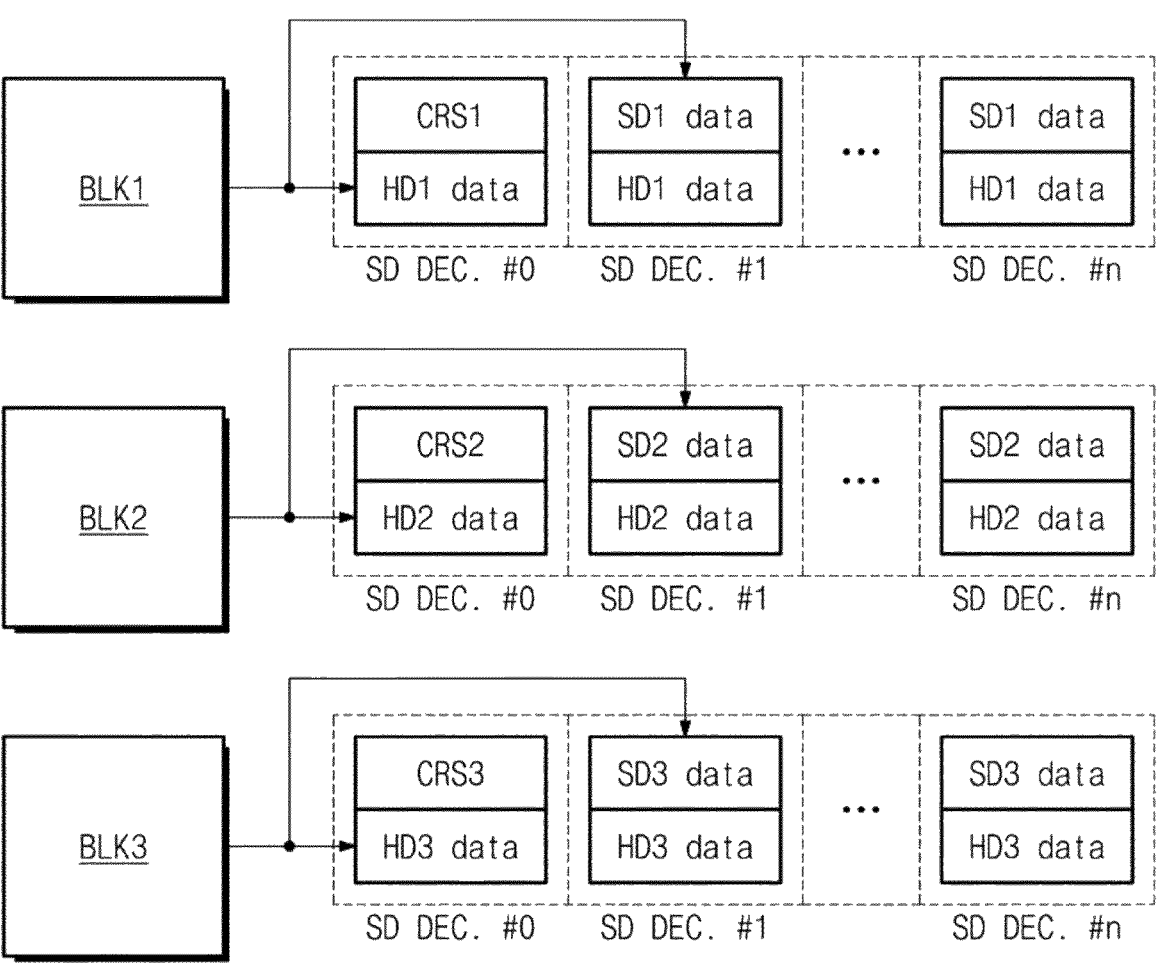
FIG. 13 is a diagram for describing an operation according to the flowchart of FIG. 12, according to an embodiment of the present disclosure.

FIG. 13 is a diagram for describing an operation according to the flowchart of FIG. 12. Referring to FIGS. 1, 12, and 13, the memory device 120 may include first to third memory blocks BLK1 to BLK3.

When the read operation on the first memory block BLK1 is performed, the controller 110 may receive first hard decision data HD1 and first soft decision data SD1 from the first memory block BLK1 of the memory device 120. Before the first soft decision data SD1 is received, the ECC engine 111 of the controller 110 may perform the initial soft decision decoding SD_DEC0 using the first hard decision data HD1 and first coarse data CRS1. Afterwards, when the first soft decision data SD1 is received, the controller 110 may replace the first coarse data CRS1 with the first soft decision data SD1 or may update the first coarse data CRS1 so that it is changed to the first soft decision data SD1, and the controller 110 may perform the subsequent soft decision decoding SD_DEC1 to SD_DECn using the first hard decision data HD1 and the first soft decision data SD1.

The read operation on the second memory block BLK2 may be similar to the read operation on the first memory block BLK1 except that second hard decision data HD2 and second soft decision data SD2 may be received and the initial soft decision decoding SD_DEC0 may be performed using second coarse data CRS2, and thus, additional description may be omitted to avoid redundancy.

The read operation on the third memory block BLK3 may be similar to the read operation on the first memory block BLK1 except that third hard decision data HD3 and third soft decision data SD3 are received and the initial soft decision decoding SD_DEC0 is performed using third coarse data CRS3, and thus, additional description may be omitted to avoid redundancy.

In an embodiment, an example of a configuration for updating or replacing the coarse data CRS1, CRS2, and CRS3 with the soft decision data SD1, SD2, and SD3 is described above, and thus, additional description may be omitted to avoid redundancy.

The controller 110 may use different coarse data in association with the first to third memory blocks BLK1 to BLK3 of the memory device 120. For example, the statuses of the first to third memory blocks BLK1 to BLK3 may be different from each other. As an example, a deterioration level of the first memory block BLK1 (e.g., the degree to which an error occurs or a ratio at which an error occurs) may be greater than a deterioration level of the second memory block BLK2, and a deterioration level of the second memory block BLK2 may be greater than a deterioration level of the third memory block BLK3. In this case, the first coarse data CRS1 may include more values corresponding to zero ("0") (e.g., a value corresponding to a weak error) compared to the second coarse data CRS2, and the second coarse data CRS2 may include more values corresponding to zero ("0") (e.g., a value corresponding to a weak error) compared to the third coarse data CRS3.

For example the ECC engine 111 of the controller 110 may perform the initial soft decision decoding SD_DEC0 using coarse data which are differently set depending on the status of the memory device 120 (or the status of a memory block). Accordingly, a time point when the ECC engine 111 starts soft decision decoding may be advanced, and the initial accuracy of soft decision decoding may be improved.

Figure 14:
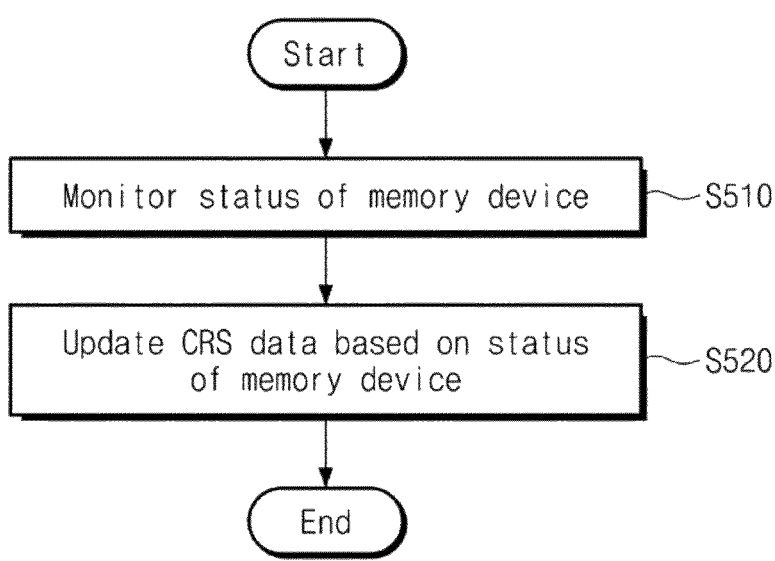
FIG. 14 is a flowchart for describing an operation of a controller of FIG. 1, according to an embodiment of the present disclosure.
Figure 15:
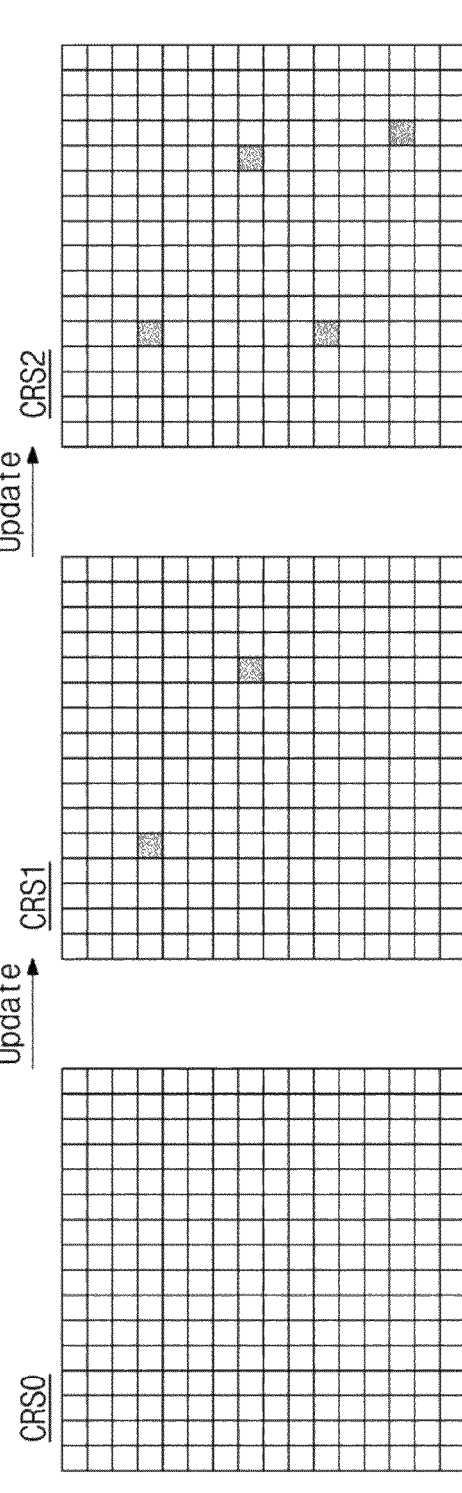
FIG. 15 is a diagram for describing an operation according to the flowchart of FIG. 14, according to an embodiment of the present disclosure.

FIG. 14 is a flowchart for describing an operation of a controller of FIG. 1. FIG. 15 is a diagram for describing an operation according to the flowchart of FIG. 14. Referring to FIGS. 1 and 14, at operation S510, the controller 110 may monitor the status of the memory device 120. Operation S510 may be similar to operation S410 of FIG. 12, and thus, additional description may be omitted to avoid redundancy.

At operation S520, the controller 110 may update the coarse data CRS based on the status of the memory device 120. For example, as the memory device 120 is used, the number of P/E cycles of the memory device 120 may increase, and the deterioration level of the memory device 120 may increase. In this case, the controller 110 may update the coarse data CRS.

For example, as illustrated in FIG. 15, in an initial state (e.g., in a state where the memory device 120 is not deteriorated), the controller 110 may perform initial soft decision decoding using initial coarse data CRS0. In embodiments, the initial coarse data CRS0 may be referred to as, for example, zeroth coarse data and 0-th or $0^{th}$ coarse data, but embodiments are not limited thereto.

Afterwards, as the memory device 120 operates, the deterioration level of the memory device 120 may increase. In this case, the controller 110 may update the initial coarse data CRS0, for example may change the initial coarse data CRS0 to first coarse data CRS1, based on the deterioration level of the memory device 120. Compared to the initial coarse data CRS0, the first coarse data CRS1 may include more values corresponding to zero ("0") (e.g., more values corresponding to the weak error). In embodiments, the values corresponding to zero ("0") may be illustrated in FIG. 15 as shaded squares.

Afterwards, as the memory device 120 operates, the deterioration level of the memory device 120 may further increase. In this case, the controller 110 may update the first coarse data CRS1, for example may change the first coarse data CRS1 to second coarse data CRS2, based on the deterioration level of the memory device 120. Compared to the first coarse data CRS1, the second coarse data CRS2 may include more values corresponding to zero ("0") (e.g., more values corresponding to the weak error).

In an embodiment, a location of a bit of coarse data which is changed to have a value of zero ("0") may be determined based on a decoding result of the ECC engine 111 (or a physical location where an error may frequently occur) or the soft decision data SD.

As described above, the controller 110 may update the coarse data CRS based on the status of the memory device 120. Accordingly, the accuracy of the initial soft decision decoding SD_DEC0 which is performed using the coarse data CRS may be improved.

Figure 16:
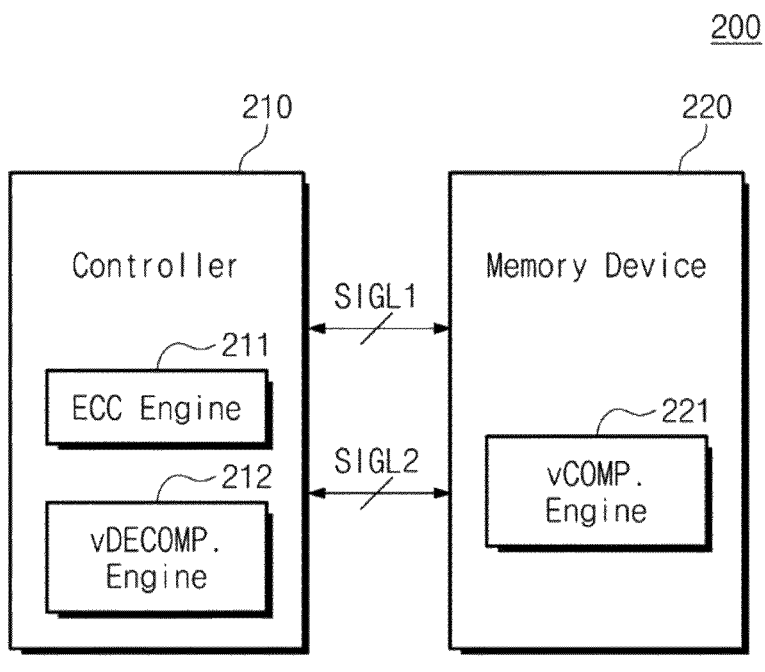
FIG. 16 is a block diagram illustrating a storage device according to an embodiment of the present disclosure, according to an embodiment of the present disclosure.

FIG. 16 is a block diagram illustrating a storage device according to an embodiment of the present disclosure. For convenience of description, additional description associated with the components described above will be omitted to avoid redundancy. Referring to FIG. 16, a storage device 200 may include a controller 210 and a memory device 220. The controller 210 and the memory device 220 may operate a described with reference to FIGS. 1 to 15.

In an embodiment, the memory device 220 may include a variable compression engine 221 (illustrated as "vCOMP. Engine"). The variable compression engine 221 may be configured to compress the soft decision data SD based on a variable compression ratio. For example, as described above, the soft decision data SD may have a high ratio of a specific bit value (e.g., a value of one ("1"), for example a value corresponding to a strong error). In this case, the soft decision data SD may be compressed with a relatively high compression ratio. In contrast, in the soft decision data SD, a ratio of a specific bit value (e.g., a value of one ("1"), for example a value corresponding to a strong error) may decrease depending on the status of memory cells. In this case, the soft decision data SD may be compressed with a relatively low compression ratio. The variable compression engine 221 may perform variable compression based on the status of the soft decision data SD or a bit value ratio of the soft decision data SD and may generate the compressed soft decision data CSD. The size of the compressed soft decision data CSD may vary depending on a compression ratio or the status of memory cells.

The controller 210 may include an ECC engine 211 and a variable decompression engine 212 (illustrated as "vDE-COMP. Engine"). The ECC engine 211 may operate based on the method described with reference to FIGS. 1 to 15, and thus, additional description may be omitted to avoid redundancy.

The variable decompression engine 212 may decompress the compressed soft decision data CSD received from the memory device 220. For example, the compressed soft decision data CSD received from the memory device 220 may be in a state of being compressed based on a variable compression ratio. The variable decompression engine 212 may decompress the compressed soft decision data CSD based on the variable compression ratio and may generate the soft decision data SD.

In an embodiment, the variable compression ratio may be managed by the controller 210 or the memory device 220. For example, the controller 210 may set the variable compression ratio based on the status of the memory device 220. In some embodiments, the memory device 220 may set the variable compression ratio based on the read soft decision data SD.

Figure 17:
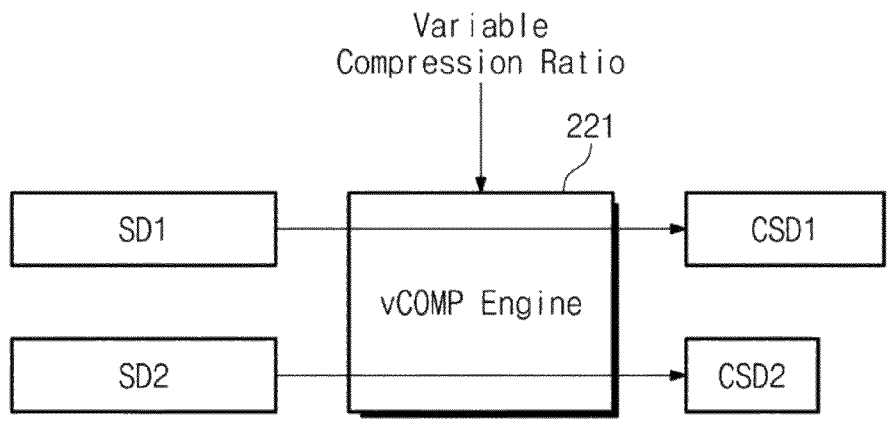
FIG. 17 is a diagram for describing a variable compression engine of FIG. 16, according to an embodiment of the present disclosure.
Figure 18:
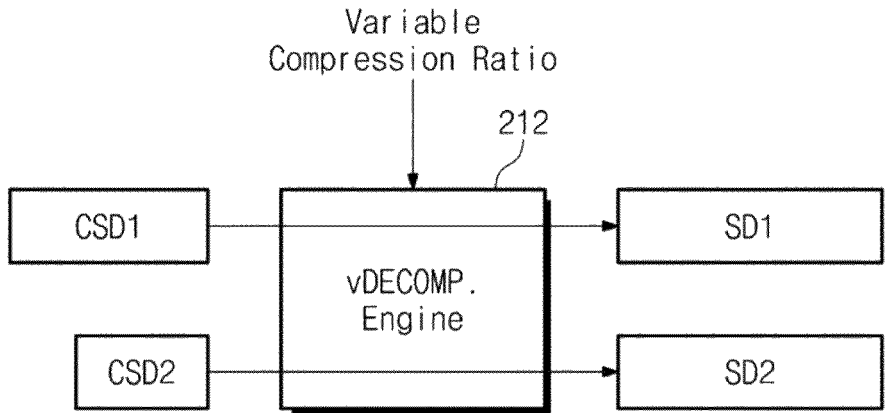
FIG. 18 is a diagram for describing a variable decompression engine of FIG. 16, according to an embodiment of the present disclosure.

FIG. 17 is a diagram for describing a variable compression engine of FIG. 16. FIG. 18 is a diagram for describing a variable decompression engine of FIG. 16. Referring to FIGS. 16 to 18, the variable compression engine 221 may compress the read soft decision data based on a variable compression ratio. For example, the variable compression engine 221 may generate first compressed soft decision data CSD1 by compressing the first soft decision data SD1 based on the variable compression ratio. The variable compression engine 221 may generate second compressed soft decision data CSD2 by compressing the second soft decision data SD2 based on the variable compression ratio. In an embodiment, the size of the first compressed soft decision data CSD1 may be larger than the size of the second compressed soft decision data CSD2, even though the size of the first soft decision data SD1 may be similar to the size of the second soft decision data SD2.

The variable decompression engine 212 may generate the soft decision data SD by decompressing the compressed soft decision data CSD based on the variable compression ratio. For example, the variable decompression engine 212 may generate the first soft decision data SD1 by decompressing the first compressed soft decision data CSD1 based on the variable compression ratio. The variable decompression engine 212 may generate the second soft decision data SD2 by decompressing the second compressed soft decision data CSD2 based on the variable compression ratio.

In an embodiment, the variable compression ratio may be set by the controller 210, may be set by the memory device 220, or may be set based on the pattern of the soft decision data SD (e.g., a ratio of a bit value).

Figure 19:
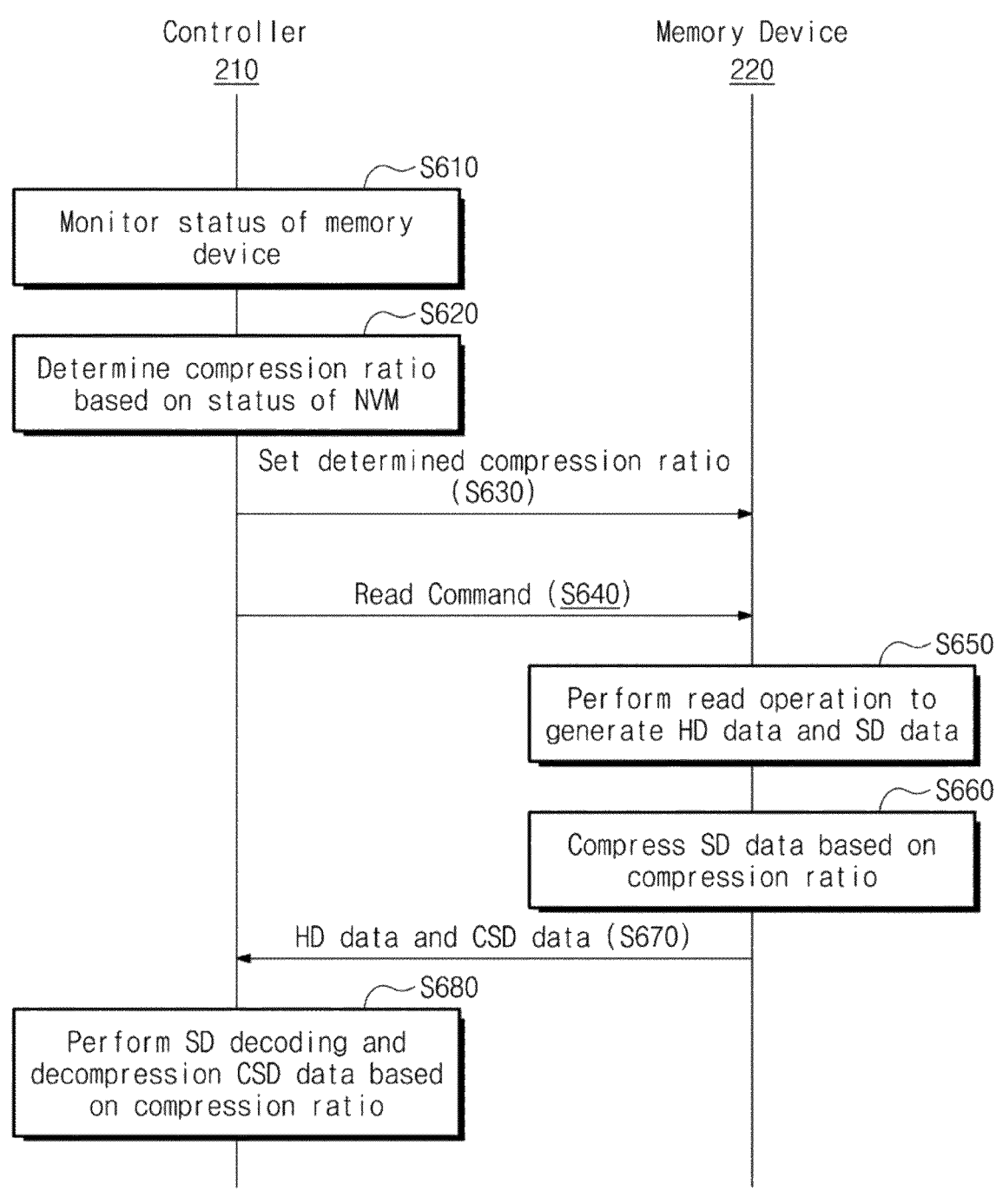
FIG. 19 is a flowchart illustrating an operation of a storage device of FIG. 16, according to an embodiment of the present disclosure.

FIG. 19 is a flowchart illustrating an operation of a storage device of FIG. 16. Referring to FIGS. 16 and 19, at operation S610, the controller 210 may monitor the status of the memory device 220. In an embodiment, a configuration for monitoring the status of the memory device 220 may be similar to that described at operation 410 of FIG. 12, and thus, additional description may be omitted to avoid redundancy.

At operation S620, the controller 210 may determine a compression ratio based on the status of the memory device 220. For example, when the deterioration level of the memory device 220 is relatively low, a first compression ratio may be selected; when the deterioration level of the memory device 220 is relatively high, a second compression ratio may be selected. In this case, the first compression ratio may be higher than the second compression ratio. For example, when the deterioration level of the memory device 220 is relatively low, a ratio of a specific value (e.g., a value of one ("1"), for example a value corresponding to a strong error) may be high in soft decision data read from the memory device 220. In this case, soft decision data may be compressed with a relatively high compression ratio. In contrast, when the deterioration level of the memory device 220 is relatively high, a ratio of a specific value (e.g., a value of one ("1"), for example a value corresponding to a strong error) may be relatively low in soft decision data read from the memory device 220. In this case, soft decision data may be compressed with a relatively low compression ratio.

At operation S630, the controller 210 may set the determined compression ratio to the memory device 220. In an embodiment, operation S630 may be performed through a "SET FEATURE" command, a reserved command, or a vendor command, or a combination thereof.

At operation S640, the controller 210 may transmit the read command to the memory device 220. At operation S650, the memory device 220 may perform the read operation to generate the hard decision data HD and the soft decision data SD. At operation S660, the memory device 220 may compress the soft decision data SD to generate the compressed soft decision data CSD.

At operation S670, the memory device 220 may sequentially transmit the hard decision data HD and the compressed soft decision data CSD to the controller 210. In operation S680, the controller 210 may decompress the compressed soft decision data CSD based on the determined compression ratio and may perform soft decision decoding. In an embodiment, operation S670 and operation S680 may correspond to operation S240 to operation S280 of FIG. 8 or operation S340 to operation S380 of FIG. 10 except that the variable compression ratio may be used. For example the controller 210 may perform soft decision decoding based on operation S240 to operation S280 of FIG. 8 or operation S340 to operation S380 of FIG. 10.

Figure 20:
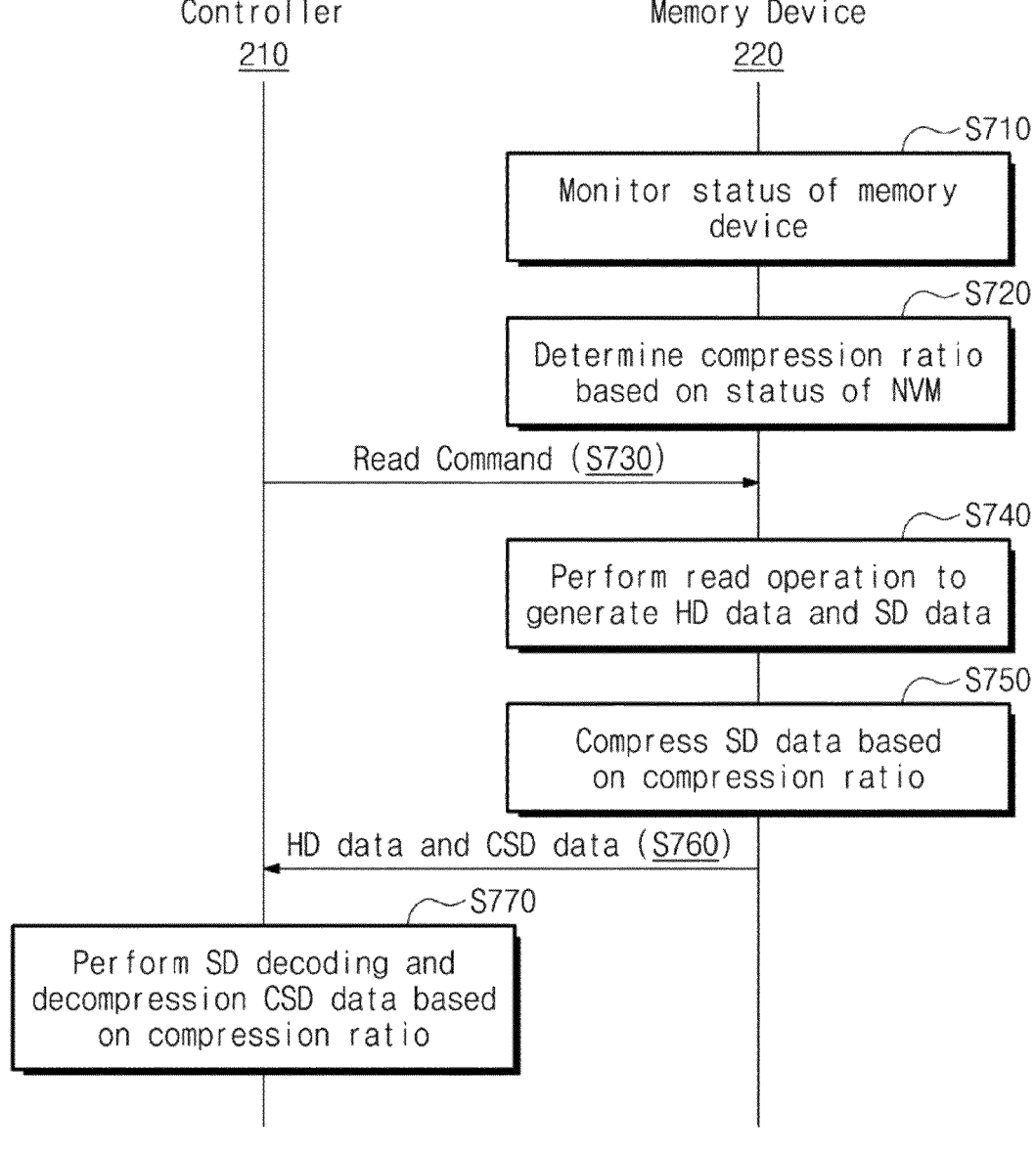
FIG. 20 is a flowchart illustrating an operation of a storage device of FIG. 16, according to an embodiment of the present disclosure.

FIG. 20 is a flowchart illustrating an operation of a storage device of FIG. 16. Referring to FIGS. 16 and 20, at operation S710, the memory device 220 may monitor the status of the memory device 220. At operation S720, the memory device 220 may determine a compression ratio based on the status of the memory device 220. Subsequently, the controller 210 and the memory device 220 may perform operation S730 to operation S770. Operation S730 to operation S770 may be similar to operation S640 to operation S680 of FIG. 19, and thus, additional description may be omitted to avoid redundancy.

In an embodiment, when the variable compression ratio is set by the memory device 220 or is set based on the pattern of the soft decision data SD (e.g., a ratio of a bit value), the controller 210 may not know an accurate variable compression ratio. In this case, the variable decompression engine 212 of the controller 210 may decompress the compressed soft decision data CSD with a predetermined compression ratio. Afterwards, the ECC engine 211 of the controller 210 may perform soft decision decoding based on the decompressed data. The variable decompression engine 212 may adjust the compression ratio based on a result of the soft decision decoding and may again decompress the compressed soft decision data CSD based on the adjusted compression ratio. As an example, when the soft decision decoding result indicates that there are a relatively large number of weak errors, the compression ratio may be decreased; when the soft decision decoding result indicates that there are a relatively large number of strong errors, the compression ratio may be increased. The variable decompression engine 212 may again decompress the compressed soft decision data CSD based on the adjusted compression ratio. The again decompressed soft decision data SD may be used in subsequent soft decision decoding.

Figure 21:
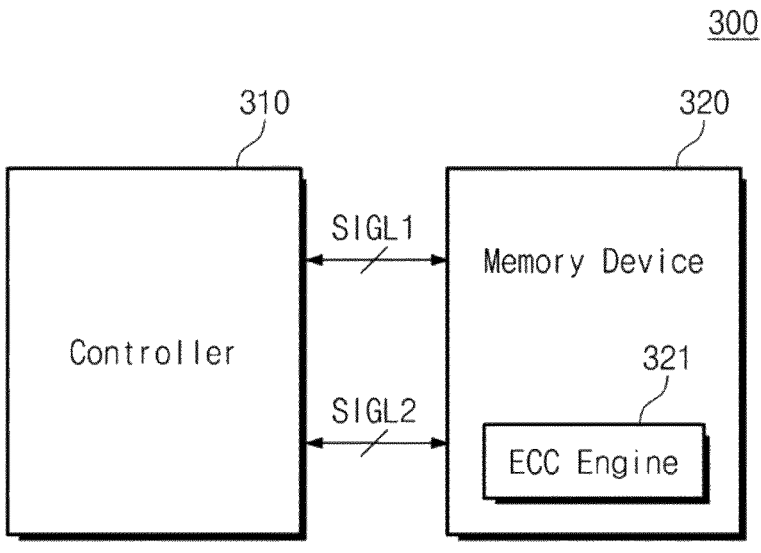
FIG. 21 is a block diagram illustrating a storage device according to an embodiment of the present disclosure.

FIG. 21 is a block diagram illustrating a storage device according to an embodiment of the present disclosure. Referring to FIG. 21, a storage device 300 may include a controller 310 and a memory device 320. The controller 310 and the memory device 320 may operate as described above with reference to FIGS. 1 to 20.

In an embodiment, the memory device 320 may include an ECC engine 321. The ECC engine 321 may perform iterative soft decision decoding as described above with reference to FIGS. 1 to 20. For example, the ECC engine 321 may perform iterative soft decision decoding based on the hard decision data HD and the soft decision data SD read from the memory device 320. In this case, before all of the soft decision data SD is read, the ECC engine 321 may start initial soft decision decoding (e.g., initial soft decision decoding) using the coarse data CRS and the hard decision data HD. As the soft decision data SD is read, the coarse data CRS may be updated or replaced with the soft decision data SD; afterwards, the ECC engine 321 may perform subsequent soft decision decoding based on the hard decision data HD and the soft decision data SD.

Figure 22:
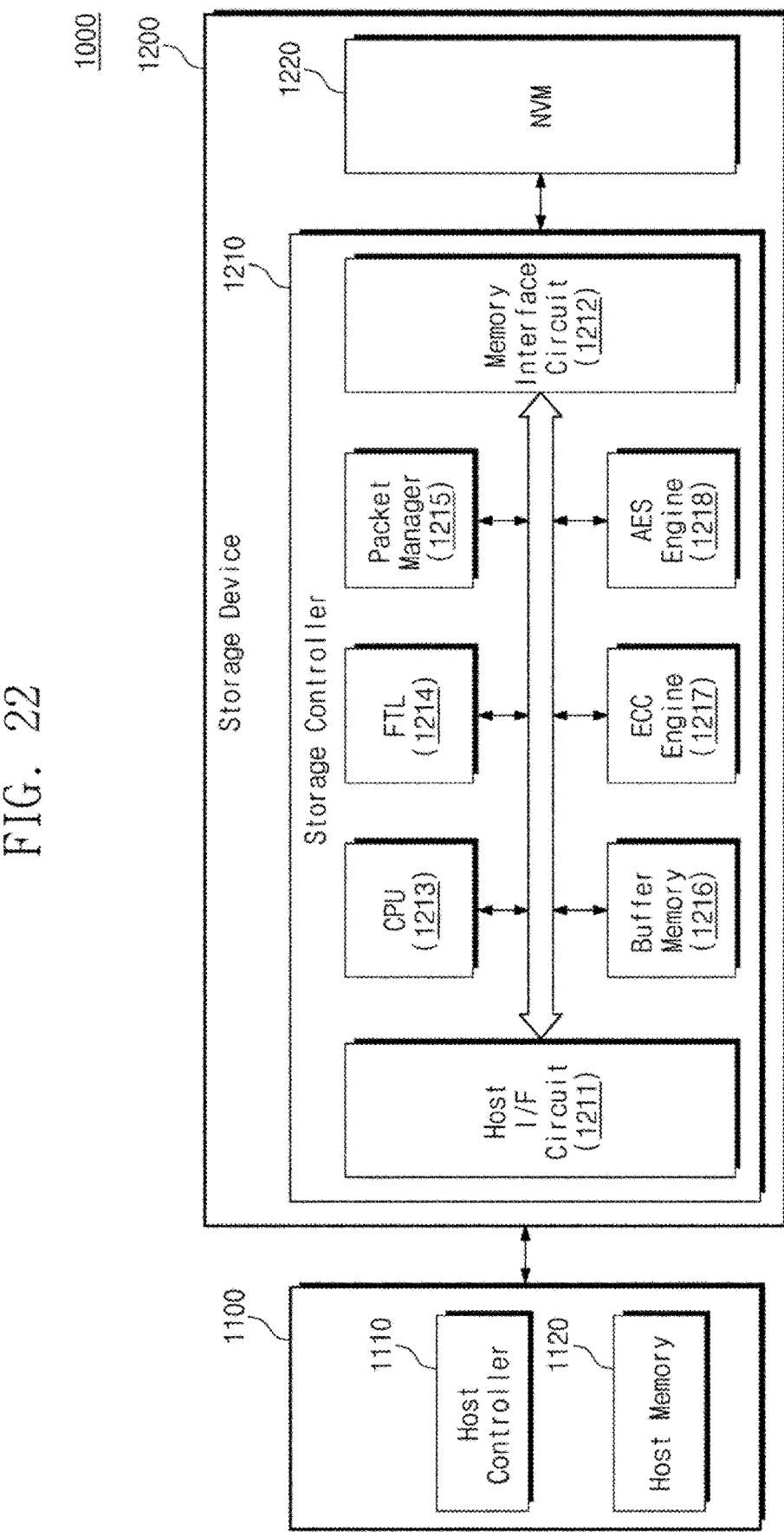
FIG. 22 is a block diagram illustrating a host-storage system according to an embodiment of the present disclosure.

FIG. 22 is a block diagram of a host storage system according to an example embodiment.

The host storage system 1000 may include a host 1100 and a storage device 1200. Further, the storage device 1200 may include a storage controller 1210 and an NVM 1220. According to an example embodiment, the host 1100 may include a host controller 1110 and a host memory 1120. The host memory 1120 may serve as a buffer memory configured to temporarily store data to be transmitted to the storage device 1200 or data received from the storage device 1200.

The storage device 1200 may include storage media configured to store data in response to requests from the host 1100. As an example, the storage device 1200 may include at least one of an SSD, an embedded memory, and a removable external memory. When the storage device 1200 is an SSD, the storage device 1200 may be a device that conforms to an NVMe standard. When the storage device 1200 is an embedded memory or an external memory, the storage device 1200 may be a device that conforms to a UFS standard or an eMMC standard. Each of the host 1100 and the storage device 1200 may generate a packet according to an adopted standard protocol and transmit the packet.

When the NVM 1220 of the storage device 1200 includes a flash memory, the flash memory may include a 2D NAND memory array or a 3D (or vertical) NAND (VNAND) memory array. As another example, the storage device 1200 may include various other kinds of NVMs. For example, the storage device 1200 may include magnetic RAM (MRAM), spin-transfer torque MRAM, conductive bridging RAM (CBRAM), ferroelectric RAM (FRAM), PRAM, RRAM, and various other kinds of memories.

According to an embodiment, the host controller 1110 and the host memory 1120 may be implemented as separate semiconductor chips. In some embodiments, the host controller 1110 and the host memory 1120 may be integrated in the same semiconductor chip. As an example, the host controller 1110 may be any one of a plurality of modules included in an application processor (AP). The AP may be implemented as a System on Chip (SoC). Further, the host memory 1120 may be an embedded memory included in the AP or an NVM or memory module located outside the AP.

The host controller 1110 may manage an operation of storing data (e.g., write data) of a buffer region of the host memory 1120 in the NVM 1220 or an operation of storing data (e.g., read data) of the NVM 1220 in the buffer region.

The storage controller 1210 may include a host interface 1211, a memory interface 1212, and a CPU 1213. Further, the storage controller 1210 may further include a flash translation layer (FTL) 1214, a packet manager 1215, a buffer memory 1216, an error correction code (ECC) engine 1217, and an advanced encryption standard (AES) engine 1218. The storage controllers 1210 may further include a working memory (not shown) in which the FTL 1214 is loaded. The CPU 1213 may execute the FTL 1214 to control data write and read operations on the NVM 11220.

The host interface 1211 may transmit and receive packets to and from the host 1100. A packet transmitted from the host 1100 to the host interface 1211 may include a command or data to be written to the NVM 1220. A packet transmitted from the host interface 1211 to the host 1100 may include a response to the command or data read from the NVM 1220. The memory interface 1212 may transmit data to be written to the NVM 1220 to the NVM 1220 or receive data read from the NVM 1220. The memory interface 1212 may be configured to comply with a standard protocol, such as Toggle or open NAND flash interface (ONFI).

The FTL 1214 may perform various functions, such as an address mapping operation, a wear-leveling operation, and a garbage collection operation. The address mapping operation may be an operation of converting a logical address received from the host 1100 into a physical address used to actually store data in the NVM 1220. The wear-leveling operation may be a technique for preventing excessive deterioration of a specific block by allowing blocks of the NVM 1220 to be uniformly used. As an example, the wear-leveling operation may be implemented using a firmware technique that balances erase counts of physical blocks. The garbage collection operation may be a technique for ensuring usable capacity in the NVM 1220 by erasing an existing block after copying valid data of the existing block to a new block.

The packet manager 1215 may generate a packet according to a protocol of an interface, which consents to the host 1100, or parse various types of information from the packet received from the host 1100. In addition, the buffer memory 1216 may temporarily store data to be written to the NVM 1220 or data to be read from the NVM 1220. Although the buffer memory 1216 may be a component included in the storage controller 1210, the buffer memory 1216 may be outside the storage controller 1210.

The ECC engine 1217 may perform error detection and correction operations on read data read from the NVM 1220. More specifically, the ECC engine 1217 may generate parity bits for write data to be written to the NVM 1220, and the generated parity bits may be stored in the NVM 1220 together with write data. During the reading of data from the NVM 1220, the ECC engine 1217 may correct an error in the read data using the parity bits read from the NVM 1220 along with the read data, and output error-corrected read data.

The AES engine 1218 may perform at least one of an encryption operation and a decryption operation on data input to the storage controller 1210 using a symmetric-key algorithm.

In an embodiment, the ECC engine 1217 may perform soft decision decoding as described above with reference to FIGS. 1 to 21.

According to the present disclosure, a controller configured to control a memory device may sequentially receive hard decision data and soft decision data from the memory device. In this case, before a time point when the reception of the soft decision data is completed (or before the soft decision data is received), the controller may start initial soft decision decoding based on hard decision data and coarse data. For example, because a time point when the controller starts decoding is advanced, a point in when the decoding is completed may also be advanced. Accordingly, a controller configured to control a memory with improved performance, an operation method of the controller, and an operation method of a storage device including the memory device and the controller are provided.

Although some embodiments of the present disclosure are described above, it will be apparent to those of ordinary skill in the art that various changes and modifications may be made thereto without departing from the spirit and scope of the present disclosure as set forth in the following claims.

What is claimed is:

1. An operation method of a controller for controlling a memory device, the method comprising:
   sequentially receiving first hard decision data and first data from a first memory block of the memory device;
   based on the receiving of the first hard decision data being completed, starting initial soft decision decoding based on the first hard decision data and first preliminary data;
   while the initial soft decision decoding is being performed, replacing the first preliminary data with first soft decision data based on the first data received from the memory device; and
   after the initial soft decision decoding is completed, performing first soft decision decoding based on the first hard decision data and the first soft decision data.

2. The method of claim 1, wherein the first preliminary data comprises a predetermined data pattern corresponding to a status of the memory device.

3. The method of claim 1, further comprising:
   iteratively performing soft decision decoding a predetermined number of times, based on the first hard decision data and the first soft decision data.

4. The method of claim 1, wherein the first data comprises the first soft decision data, and
   wherein the first soft decision data is read from memory cells corresponding to the first hard decision data.

5. The method of claim 1, wherein the first data is obtained by compressing the first soft decision data, and
   wherein the first soft decision data is read from memory cells corresponding to the first hard decision data.

6. The method of claim 5, wherein the replacing comprises:
   decompressing the first data to generate the first soft decision data; and
   updating the first preliminary data based on the first soft decision data.

7. The method of claim 1, wherein the first hard decision data and the first data are received from the memory device based on a first read command transmitted to the memory device.

8. The method of claim 1, further comprising:
   sequentially receiving second hard decision data and second data from a second memory block of the memory device;

based on the receiving of the second hard decision data being completed, starting second soft decision decoding based on the second hard decision data and second preliminary data;
   while the second soft decision decoding is being performed, replacing the second preliminary data with second soft decision data based on the second data received from the memory device; and
   after the second soft decision decoding is completed, performing third soft decision decoding based on the second hard decision data and the second soft decision data.

9. The method of claim 8, wherein the first preliminary data is different from the second preliminary data.

10. The method of claim 1, further comprising:
    monitoring a status of the memory device; and
    updating the first preliminary data with third preliminary data based on the status of the memory device.

11. The method of claim 10, further comprising:
    sequentially receiving third hard decision data and third data from the first memory block of the memory device; and
    based on the receiving of the third hard decision data being completed, starting fourth soft decision decoding based on the third hard decision data and the third preliminary data.

12. A controller for controlling a memory device, the controller comprising:
    a NAND interface circuit configured to receive first hard decision data and first compressed soft decision data from the memory device;
    a decompression engine configured to decompress the first compressed soft decision data to generate first soft decision data;
    a random access memory (RAM) configured to store the first hard decision data and the first soft decision data; and
    an error correction code (ECC) engine configured to:
      based on the first hard decision data being stored in the RAM, start initial soft decision decoding based on the first hard decision data and first preliminary data, and
      after the first soft decision data is stored in the RAM, perform first soft decision decoding based on the first hard decision data and the first soft decision data.

13. The controller of claim 12, wherein the ECC engine is further configured to start the initial soft decision decoding before all of the first compressed soft decision data is received through the NAND interface circuit.

14. The controller of claim 12, wherein the decompression engine is further configured to:
    decompress the first compressed soft decision data based on a first compression ratio; and
    generate the first soft decision data.

15. The controller of claim 14, wherein the decompression engine is further configured to:
    adjust the first compression ratio to a second compression ratio based on a result of the first soft decision decoding; and
    decompress the first compressed soft decision data using the second compression ratio to generate second soft decision data.

16. An operation method of a storage device including a memory device and a controller, the method comprising:
    transmitting, by the controller, a read command to the memory device;

generating, by the memory device, first hard decision data and first soft decision data by performing a read operation on a selected word line based on the read command;

generating, by the memory device, first compressed soft decision data by compressing the first soft decision data;

transmitting, by the memory device, the first hard decision data and the first compressed soft decision data to the controller;

based on reception of the first hard decision data being completed by the controller, starting, by the controller, initial soft decision decoding based on the first hard decision data and first preliminary data;

generating, by the controller, first decompressed soft decision data by decompressing the first compressed soft decision data; and performing first soft decision decoding based on the first hard decision data and the first decompressed soft decision data.

17. The method of claim 16, wherein the first hard decision data and the first compressed soft decision data are sequentially transmitted to the controller.

18. The method of claim 16, wherein the controller is further configured to:

receive the first compressed soft decision data from the memory device while the initial soft decision decoding is being performed; and decompress the first compressed soft decision data to generate the first soft decision data.

19. The method of claim 16, wherein the memory device is further configured to generate the first compressed soft decision data by compressing the first soft decision data based on a variable compression ratio.

20. The method of claim 19, wherein the controller is further configured to:

decompress the first compressed soft decision data based on a first compression ratio to generate the first decompressed soft decision data;

adjust the first compression ratio to a second compression ratio based on a result of the first soft decision decoding; and decompress the first compressed soft decision data based on the second compression ratio to generate second decompressed soft decision data.

\* \* \* \* \*